United States Patent
Mori et al.

(10) Patent No.: US 12,255,399 B2
(45) Date of Patent: Mar. 18, 2025

(54) ANTENNA MODULE, COMMUNICATION APPARATUS INCLUDING THE SAME, AND CIRCUIT SUBSTRATE

(71) Applicant: Murata Manufacturing Co., Ltd., Nagaokakyo (JP)

(72) Inventors: Hirotsugu Mori, Nagaokakyo (JP); Tadashi Sugahara, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 495 days.

(21) Appl. No.: 17/543,758

(22) Filed: Dec. 7, 2021

(65) Prior Publication Data

US 2022/0094074 A1    Mar. 24, 2022

Related U.S. Application Data

(63) Continuation of application No. PCT/JP2020/017024, filed on Apr. 20, 2020.

(30) Foreign Application Priority Data

Jun. 7, 2019    (JP) .................. 2019-106776

(51) Int. Cl.
*H01Q 21/06* (2006.01)
*H01Q 1/22* (2006.01)
(Continued)

(52) U.S. Cl.
CPC ......... *H01Q 21/065* (2013.01); *H01Q 1/2283* (2013.01); *H01Q 5/385* (2015.01);
(Continued)

(58) Field of Classification Search
CPC .... H01Q 21/065; H01Q 21/0006; H01Q 1/48; H01Q 1/2283; H01Q 5/385; H01Q 21/24; H04B 1/0057; H04B 1/006
See application file for complete search history.

(56) References Cited

U.S. PATENT DOCUMENTS

2009/0046029 A1* 2/2009 Nagai ............... H01Q 9/045
343/700 MS
2010/0225554 A1* 9/2010 Huang ............... H01Q 15/0086
343/859
(Continued)

FOREIGN PATENT DOCUMENTS

JP    2013-58990 A    3/2013
JP    2018-56937 A    4/2018
(Continued)

OTHER PUBLICATIONS

Written Opinion of the International Searching Authority mailed on Jul. 7, 2020, received for PCT Application PCT/JP2020/017024, filed on Apr. 20, 2020, 4 pages. (Previously filed; submitting English translation only.).

(Continued)

*Primary Examiner* — Hoang V Nguyen
*Assistant Examiner* — Yonchan J Kim
(74) *Attorney, Agent, or Firm* — XSENSUS LLP

(57) ABSTRACT

An antenna module includes feeding elements arranged adjacent to each other and filters connected to the respective feeding elements. Each of the filters includes a plurality of resonant lines that is not connected to each other. The filters are arranged between the feeding elements so as to cross a virtual line equidistant from the feeding elements when the antenna module is viewed in plan from the normal direction.

20 Claims, 16 Drawing Sheets

(51) Int. Cl.
| | | |
|---|---|---|
| | *H01Q 1/48* | (2006.01) |
| | *H01Q 5/385* | (2015.01) |
| | *H01Q 21/00* | (2006.01) |
| | *H01Q 21/24* | (2006.01) |
| | *H04B 1/00* | (2006.01) |

(52) U.S. Cl.
CPC ......... *H01Q 21/0006* (2013.01); *H01Q 21/24* (2013.01); *H04B 1/0057* (2013.01); *H01Q 1/48* (2013.01)

(56) References Cited

U.S. PATENT DOCUMENTS

| | | |
|---|---|---|
| 2016/0172757 A1 | 6/2016 | Gottl |
| 2019/0221937 A1* | 7/2019 | Onaka .................... H01Q 5/385 |

FOREIGN PATENT DOCUMENTS

| | | |
|---|---|---|
| JP | 2019-57775 A | 4/2019 |
| WO | 2007/069366 A1 | 6/2007 |
| WO | 2018/074377 A1 | 4/2018 |
| WO | 2019/054063 A1 | 3/2019 |

OTHER PUBLICATIONS

International Search Report and Written Opinion mailed on Jul. 7, 2020, received for PCT Application PCT/JP2020/017024, Filed on Apr. 20, 2020, 9 pages including English Translation.

* cited by examiner

ANTENNA MODULE, COMMUNICATION APPARATUS INCLUDING THE SAME, AND CIRCUIT SUBSTRATE

CROSS-REFERENCE TO RELATED APPLICATIONS

The present application claims priority to Japanese patent application JP2019-106776, filed Jun. 7, 2019, and PCT/JP2020/017024, filed Apr. 20, 2020, the entire contents of each of which being incorporated herein by reference.

TECHNICAL FIELD

The present disclosure relates to an antenna module, a communication apparatus including the antenna module, and a circuit substrate. More specifically, the present disclosure relates to arrangement of filters in an array antenna in which the filters are formed in the same substrate.

BACKGROUND ART

Japanese Unexamined Patent Application Publication No. 2000-114847 (Patent Document 1) discloses an array antenna in which a plurality of antenna elements is two-dimensionally arrayed. In the array antenna disclosed in Japanese Unexamined Patent Application Publication No. 2000-114847 (Patent Document 1), the antenna elements are divided into a plurality of array groups, and a common feeding point is set for each of the groups. A radio frequency signal distributed from the corresponding feeding point is supplied to the antenna elements of each array group. With such a configuration, directional characteristics of radio waves to be radiated can be adjusted by individually controlling the array groups.

CITATION LIST

Patent Document

Patent Document 1: Japanese Unexamined Patent Application Publication No. 2000-114847

SUMMARY

Technical Problems

In the array antenna as described above, the radio frequency signal is supplied from the common feeding point to the respective antenna elements (radiation elements) using individual feeder lines. In general, in the array antenna, when a wavelength of the radio waves that are radiated is $\lambda$, the radiation elements may be arranged at an interval of substantially $\lambda/2$. In this case, as recognized by the present inventors, in order to prevent interference of the feeder lines between the adjacent radiation elements each other, it is necessary to arrange the corresponding feeder lines in regions of a distance of $\lambda/4$ from the respective antenna elements.

Further, in the case where circuits such as filters are arranged for the respective radiation elements in the substrate of the array antenna, when a single circuit cannot be arranged in the region of the distance of $\lambda/4$ from the corresponding antenna element, the circuits are not possibly accommodated in a region of the whole array antenna unless the circuits are appropriately laid out.

The present disclosure has been made in order to solve such problems, and an aspect thereof is to appropriately arrange a plurality of filters in a region of an antenna module in which the filters are formed in the same substrate while suppressing increase in the size of the antenna module in an array antenna formed by including the antenna module.

Solutions

An antenna module according to an aspect of the present disclosure includes a first radiation element and a second radiation element arranged adjacent to each other and having planar shapes, a first filter connected to the first radiation element, and a second filter connected to the second radiation element. Each of the first filter and the second filter includes a plurality of resonant lines that is not connected to each other. Each of the first filter and the second filter is arranged between the first radiation element and the second radiation element so as to cross a virtual line equidistant from the first radiation element and the second radiation element when the antenna module is viewed in plan from a normal direction.

An antenna module according to another aspect of the present disclosure includes a first sub antenna and a second sub antenna arranged adjacent to each other. Each of the first sub antenna and the second sub antenna includes a plurality of radiation elements having planar shapes and arrayed in a second direction different from a first direction toward the second sub antenna from the first sub antenna. The antenna module further includes a first filter connected to the radiation element included in the first sub antenna and a second filter connected to the radiation element included in the second sub antenna. Each of the first filter and the second filter includes a plurality of resonant lines that is not connected to each other. Each of the first filter and the second filter is arranged between the first sub antenna and the second sub antenna so as to cross a virtual line equidistant from the first sub antenna and the second sub antenna when the antenna module is viewed in plan from a normal direction. The first filter and the second filter are arranged side by side in the second direction.

A circuit substrate according to still another aspect of the present disclosure relates to a circuit substrate including a first terminal and a second terminal connected to a first radiation element and a second radiation element arranged adjacent to each other and having planar shapes, respectively. The circuit substrate includes a first filter connected to the first terminal and a second filter connected to the second terminal. Each of the first filter and the second filter includes a plurality of resonant lines that is not connected to each other. Each of the first filter and the second filter is arranged between the first terminal and the second terminal so as to cross a virtual line equidistant from the first terminal and the second terminal when the circuit substrate is viewed in plan from a normal direction.

Advantageous Effects

With the antenna module according to the present disclosure, the filters corresponding to the two radiation elements (sub antennas) arranged adjacent to each other are arranged between the two radiation elements (sub antennas) so as to cross the virtual line equidistant from the two radiation elements (sub antennas) and are arranged in the direction orthogonal to the direction in which the two radiation elements (sub antennas) are adjacent to each other when the antenna module is viewed in plan. With this configuration, the filters can be appropriately arranged in a region of the antenna module, so that increase in the size of the antenna module can be suppressed.

DESCRIPTION OF EMBODIMENTS

Figure 1:
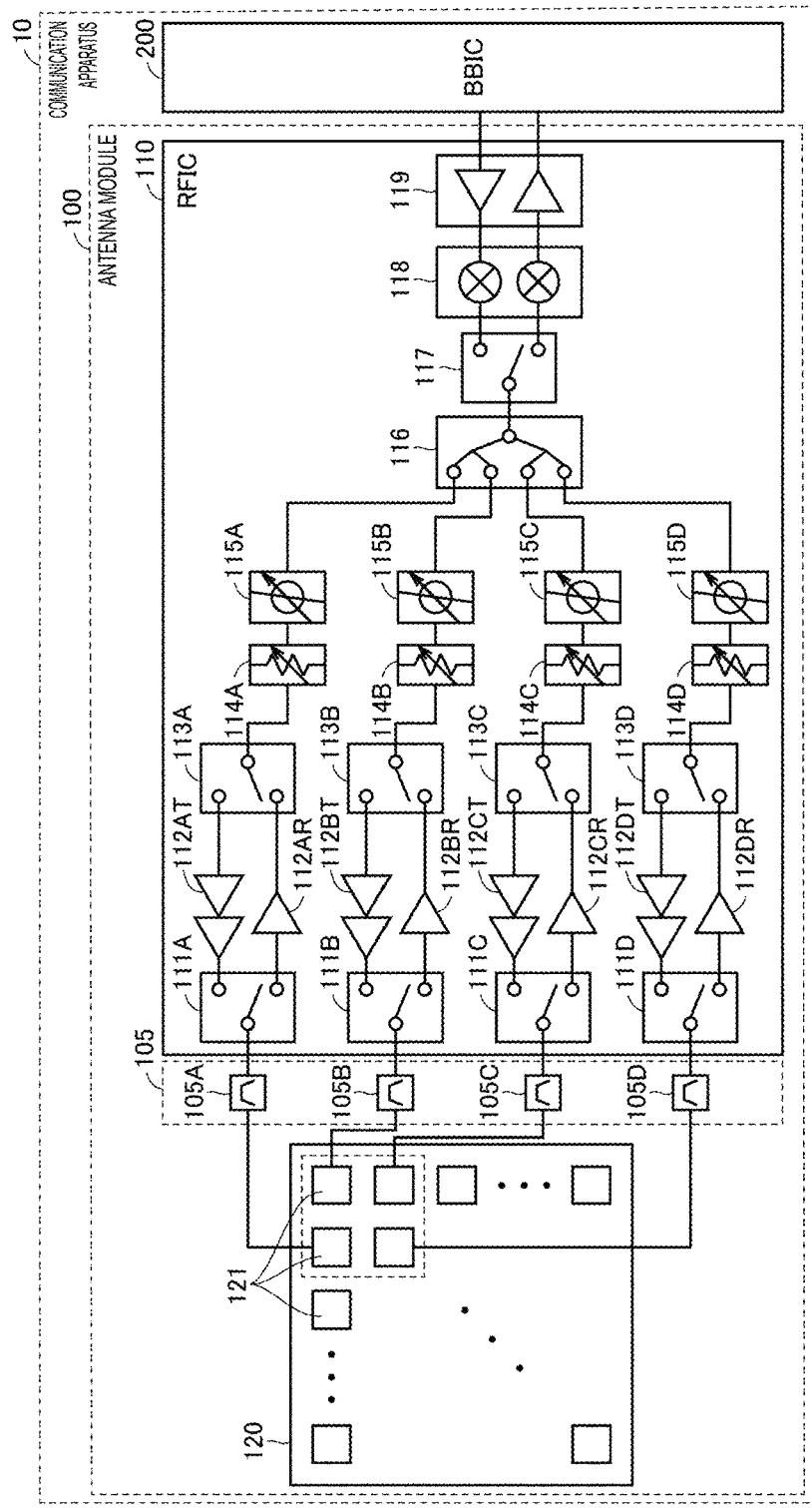
FIG. 1 is a block diagram of a communication apparatus to which an antenna module according to a first embodiment is applied.

Hereinafter, embodiments of the present disclosure will be described in detail with reference to the accompanying drawings. In the accompanying drawings, the same or corresponding portions are denoted by the same reference numerals, and description thereof will not be repeated.

First Embodiment (Basic Configuration of Communication Apparatus)

FIG. 1 is an example of a block diagram of a communication apparatus 10 to which an antenna module 100 according to a first embodiment is applied. The communication apparatus 10 is, for example, a mobile terminal such as a mobile phone, a smart phone, and a tablet or a personal computer having a communication function. As a frequency band of radio waves that are used in the antenna module 100 in the embodiment, radio waves in a millimeter wave band, which have center frequencies of 28 GHz, 39 GHz, 60 GHz, and the like, are exemplified. Radio waves in frequency bands other than the above-described ones can however be applied, such as a band up to 300 GHz.

Referring to FIG. 1, the communication apparatus 10 includes the antenna module 100 and a BBIC 200 configuring a baseband signal processing circuit. The antenna module 100 includes an RFIC 110 that is an example of a feeding circuit, an antenna device 120, and a filter device 105. The communication apparatus 10 up-converts a signal transmitted from the BBIC 200 to the antenna module 100 into radio frequency signals in the RFIC 110 and radiates the signals from the antenna device 120 after passing through the filter device 105. The communication apparatus 10 transmits radio frequency signals received by the antenna device 120 to the RFIC 110 for down conversion after passing through the filter device 105 and the down-converted signal is processed in the BBIC 200.

FIG. 1 illustrates only configurations corresponding to four feeding elements 121 among a plurality of feeding elements 121 (radiation elements) configuring the antenna device 120 for ease of description, and illustration of configurations corresponding to the other feeding elements 121 having similar configurations is omitted. In this context "feeding element" may be construed as the radiation element itself. However, "feeding element" may also include, as a separate component, the feed path that conveys RF to/from each radiating element with other circuitry such as filter 105. Although FIG. 1 illustrates an example in which the antenna device 120 is formed of the plurality of feeding elements 121 arranged in a two-dimensional array, a one-dimensional array in which the plurality of feeding elements 121 is arranged in a line may be used. In the embodiment, the feeding elements 121 are patch antennas having substantially square flat plate shapes.

The RFIC 110 includes switches 111A to 111D, 113A to 113D, and 117, power amplifiers 112AT to 112DT, low noise amplifiers 112AR to 112DR, attenuators 114A to 114D, phase shifters 115A to 115D, a signal multiplexer/demultiplexer 116, a mixer 118, and an amplifier circuit 119.

When the radio frequency signal is transmitted, the switches 111A to 111D and 113A to 113D are switched to the side of the power amplifiers 112AT to 112DT, and the switch 117 is connected to a transmission-side amplifier of the amplifier circuit 119. When the radio frequency signals are received, the switches 111A to 111D and 113A to 113D are switched to the side of the low noise amplifiers 112AR to 112DR, and the switch 117 is connected to a reception-side amplifier of the amplifier circuit 119.

The signal transmitted from the BBIC 200 is amplified by the amplifier circuit 119 and up-converted by the mixer 118. The transmission signal, which is the up-converted radio frequency signal, is divided into four by the signal multiplexer/demultiplexer 116, passes through four signal paths, and is fed to respective different feeding elements 121. At this time, the directivity of the antenna device 120 can be adjusted by individually adjusting the phase shift degrees of the phase shifters 115A to 115D arranged in the respective signal paths.

The reception signals, which are the radio frequency signals received by the feeding elements 121, pass through four different signal paths and are multiplexed by the signal multiplexer/demultiplexer 116. The multiplexed reception signal is down-converted by the mixer 118, amplified by the amplifier circuit 119, and transmitted to the BBIC 200.

The filter device 105 includes filters 105A to 105D. The filters 105A to 105D are respectively connected to the switches 111A to 111D in the RFIC 110. The filters 105A to 105D have a function of attenuating signals in a specific frequency band. The filters 105A to 105D may be band pass filters, high pass filters, low pass filters, or combinations thereof. The radio frequency signals from the RFIC 110 pass through the filters 105A to 105D and are supplied to the corresponding feeding elements 121.

In the case of the radio frequency signal in the millimeter wave band, a longer transmission line tends to cause noise components to be easily mixed. Therefore, it is preferable that a distance between the filter device 105 and the feeding elements 121 be as short as possible. That is, it is possible to suppress unnecessary waves from being radiated from the feeding elements by causing the radio frequency signals to pass through the filter device 105 immediately before being radiated from the feeding elements 121. It is also possible to remove unnecessary waves included in the reception signals by causing the reception signals to pass through the filter device 105 immediately after being received by the feeding elements 121.

Although the filter device 105 and the antenna device 120 are separately illustrated in FIG. 1, in the present disclosure, the filter device 105 is formed inside the antenna device 120, as will be described later.

The RFIC 110 is formed as, for example, a one-chip integrated circuit component including the above-described circuit configuration. Alternatively, devices (switches, power amplifiers, low noise amplifiers, attenuators, and phase shifters) corresponding to the respective feeding elements 121 in the RFIC 110 may be formed as one-chip integrated circuit components for the corresponding feeding elements 121.

(Configuration of Antenna Module)

Figure 2:
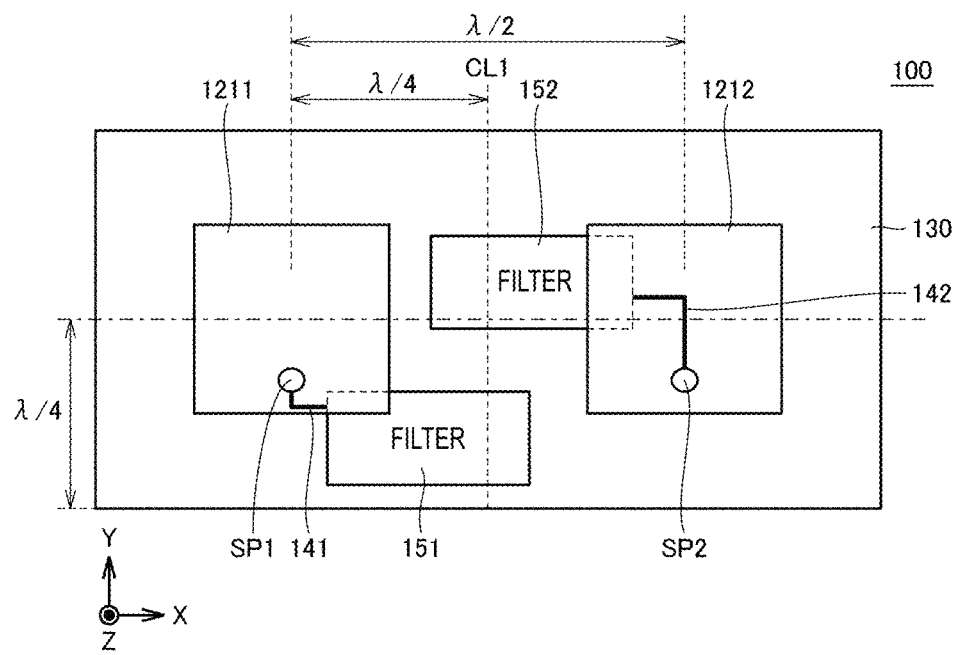
FIG. 2 is a plan perspective view of the antenna module in FIG. 1.
Figure 3:
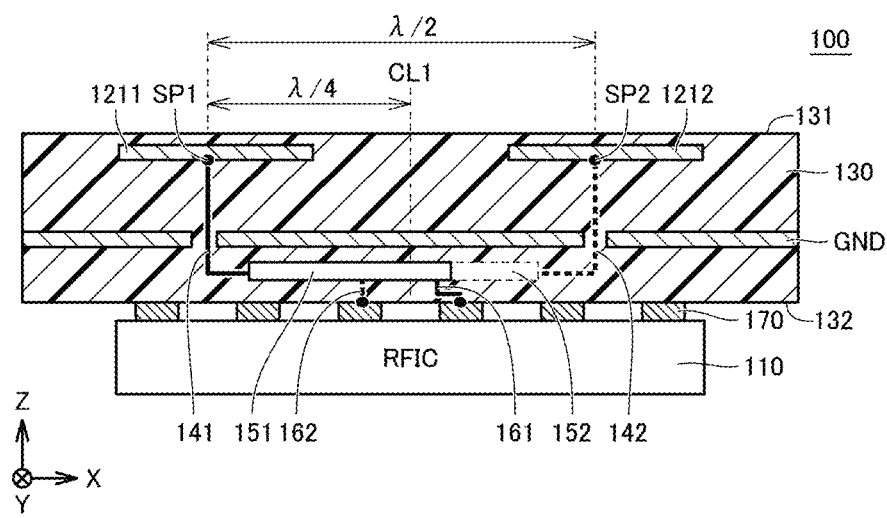
FIG. 3 is a side perspective view of a first example of the antenna module in FIG. 1.

Next, the configuration of the antenna module 100 in the first embodiment will be described in detail with reference to FIGS. 2 and 3. FIG. 2 is a plan perspective view of the antenna module 100, and FIG. 3 is a side perspective view of the antenna module.

Although the case where the antenna module 100 is an array antenna including two feeding elements 1211 and 1212 as the radiation elements will be described in FIGS. 2 and 3 as an example, the number of feeding elements may be equal to or more than three, and further, the feeding elements may be two-dimensionally arrayed. The antenna module includes, in addition to the feeding elements 1211 and 1212 and the RFIC 110, a dielectric substrate 130, feeding wiring 141 and feeding wiring 142, filters 151 and 152, connection wiring 161 and connection wiring 162, and a ground electrode GND. In the following description, a normal direction (radiation direction of radio waves) of the dielectric substrate 130 is defined as a Z-axis direction, and a plane perpendicular to the Z-axis direction is defined by an X axis and a Y axis. In addition, a positive direction and a negative direction of the Z axis in each drawing may be referred to as an upper side and a lower side, respectively.

The dielectric substrate 130 is, for example, a low temperature co-fired ceramics (LTCC) multilayer substrate, a multilayer resin substrate formed by laminating a plurality of resin layers made of resin such as epoxy or polyimide, a multilayer resin substrate formed by laminating a plurality of resin layers made of liquid crystal polymer (LCP) having a lower dielectric constant, a multilayer resin substrate formed by laminating a plurality of resin layers made of fluorine-based resin, or a ceramic multilayer substrate other than LTCC. The dielectric substrate 130 does not necessarily have a multilayer structure and may be a single-layer substrate.

The dielectric substrate 130 has a substantially rectangular shape, and the feeding elements 1211 and 1212 are arranged on an upper surface 131 (a surface in the positive direction of the Z axis) or an internal layer thereof. The feeding elements 1211 and 1212 are patch antennas having substantially square planar shapes. The feeding elements 1211 and 1212 are arranged adjacent to each other along the X-axis direction of the dielectric substrate 130. When the wavelength of the radio waves that are radiated from the antenna module is $\lambda$, the feeding element 1211 and the feeding element 1212 are arranged such that their plane centers (intersection points of diagonal lines) are spaced apart by substantially $\lambda/2$.

In the dielectric substrate 130, the ground electrode GND having a flat plate shape is arranged in a layer closer to a lower surface 132 (surface in the negative direction of the Z axis) than the feeding elements 1211 and 1212 so as to face the feeding elements 1211 and 1212. The RFIC 110 is mounted on the lower surface 132 of the dielectric substrate 130 with solder bumps 170 interposed therebetween. The RFIC 110 may be connected to the dielectric substrate 130 using a multi-pole connector instead of the solder connection.

A radio frequency signal is supplied from the RFIC 110 to a feeding point SP1 of the feeding element 1211 after passing through the connection wiring 161, the filter 151, and the feeding wiring 141. Further, a radio frequency signal is supplied from the RFIC 110 to a feeding point SP2 of the feeding element 1212 after passing through the connection wiring 162, the filter 152, and the feeding wiring 142. In the example of FIG. 2, the feeding point of each feeding element is arranged at a position offset from the center of the feeding element in the negative direction of the Y axis. By setting the feeding point at such a position, radio waves having a polarization direction being the Y-axis direction are radiated from each feeding element.

Each of the feeding wiring and the connection wiring is formed by a wiring pattern formed between layers of the dielectric substrate 130 and a via penetrating through the layers. In the antenna module 100, conductors configuring the radiation elements, wiring patterns, electrodes, vias, and the like are made of metal containing aluminum (Al), copper (Cu), gold (Au), silver (Ag), or an alloy thereof as a main component.

The filters 151 and 152 correspond to the filter device 105 illustrated in FIG. 1. Although the filters 151 and 152 are arranged between the lower surface 132 of the dielectric substrate 130 and the ground electrode GND in the example of FIG. 3, the filters 151 and 152 may be arranged in a layer between the feeding elements 1211 and 1212 and the ground electrode GND as in an example of FIG. 4. In FIG. 2 and subsequent plan perspective views, each filter is expressed by a rectangular shape being a region that can be occupied by the filter. The region may however have a substantially square shape or a more elongated rectangular shape depending on the configuration of the filter. Here, the "region that can be occupied by each filter" is not a region that is occupied by shapes of the resonant lines but a region including all of the resonant lines and expressed by a rectangular shape.

Figure 4:
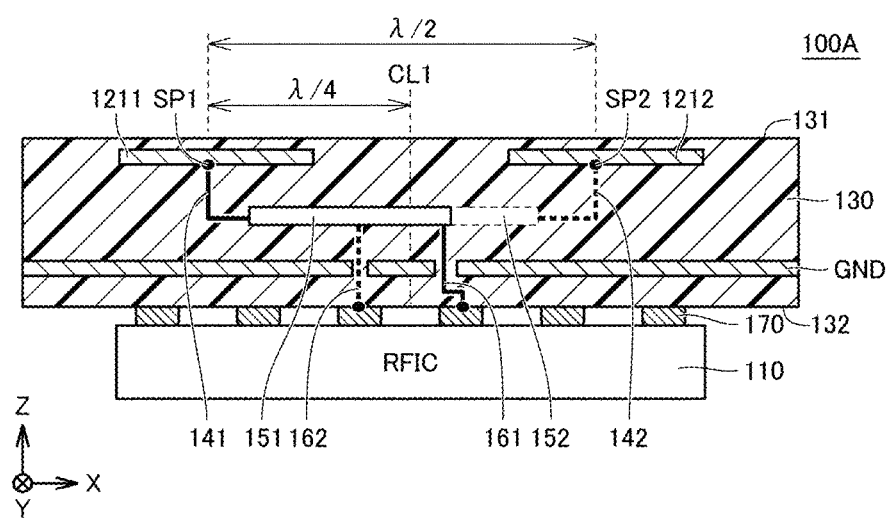
FIG. 4 is a side perspective view of a second example of the antenna module in FIG. 1.

In the configuration of an antenna module 100A in FIG. 4, when the thickness of the dielectric substrate 130 is the same, a distance between the radiation elements and the ground electrode GND can be made larger than that in the antenna module 100 in FIG. 3. Therefore, an advantage such as broadening of the frequency band width of the antenna module can be obtained. On the other hand, in the antenna module 100A, parts of the filters may face the radiation elements. Therefore, there is a possibility that directivity or the like is affected by electromagnetic coupling between the radiation elements and the filters. In the antenna module 100 in FIG. 3, coupling between the filters and the radiation elements is suppressed by the ground electrode GND. However, it is necessary to secure a distance between the ground electrode GND and the lower surface 132, and there is a possibility that the frequency band or the like is affected when the distance between the radiation element and the ground electrode GND cannot be secured. Which of the configurations illustrated in FIGS. 3 and 4 is to be employed is determined in consideration of desired antenna characteristics, a device size, manufacturing cost, and the like.

Referring again to FIG. 2, when the antenna module 100 is viewed in plan from the normal direction, each of the filters 151 and 152 is arranged so as to cross a virtual line CL1 equidistant from the feeding element 1211 and the feeding element 1212. Here, since the virtual line CL1 is equidistant from the two feeding elements, the virtual line CL1 extends in a second direction (negative direction of the Y axis) orthogonal to a first direction (positive direction of the X axis) toward the feeding element 1212 from the feeding element 1211. That is, the filter 151 and the filter 152 are arranged side by side in the second direction. The filter 151 is arranged further on the second direction side with respect to the feeding point SP1, and the filter 152 is arranged on the opposite side (positive direction of the Y axis) to the second direction with respect to the feeding point SP1.

The filter 151 and the filter 152 do not overlap with each other when the antenna module 100 is viewed in plan. Further, the filter 151 does not overlap with the feeding element 1212, and the filter 152 does not overlap with the feeding element 1211.

The filters 151 and 152 are so-called resonant line-type filters. The resonant line-type filters have a configuration in which a plurality of lines each having a length of $\lambda/4$ or $\lambda/2$ is adjacent to each other in a non-connected state and function as filters by electromagnetic field coupling between the resonant lines. The resonant line-type filter can be formed by a wiring pattern or a combination of a wiring pattern and a via, thereby obtaining an advantage that it can be relatively easily formed inside the dielectric substrate of the antenna array.

Figure 5:
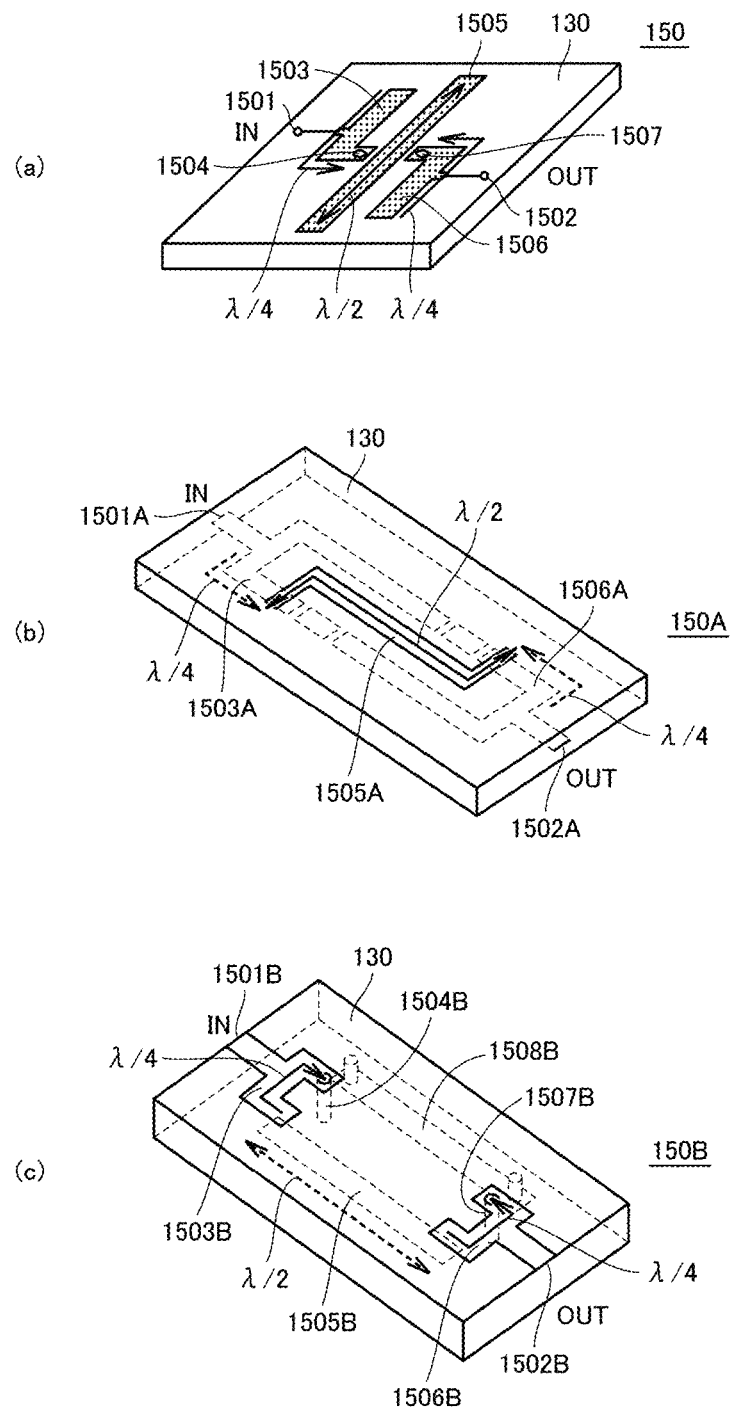
FIG. 5 is a view for explaining examples of the configuration of a resonant line-type filter.

FIG. 5 is a view illustrating some examples of the configuration of resonant line-type filters corresponding to the filters 151 and 152. Each of the filters illustrated in FIGS. 5(a) to 5(c) is formed in the dielectric substrate 130.

A filter 150 in FIG. 5(a) includes two lines 1503 and 1506 each having a length of $\lambda/4$ and a line 1505 having a length of $\lambda/2$. The lines 1503, 1505, and 1506 are formed in the same layer. The line 1503 is connected to an input terminal 1501, and the line 1506 is connected to an output terminal 1502. The line 1503 and the line 1506 have substantially L shapes, and one ends of the L shapes are connected to a ground potential by vias 1504 and 1507, respectively. The line 1503 and the line 1506 are arranged such that the ends thereof to which the vias are connected face each other and are spaced apart from each other and the other ends thereof extend in opposite directions. The line 1505 formed of a linear line is arranged between the line 1503 and the line 1506.

A filter 150A in FIG. 5(b) includes two lines 1503A and 1506A each having a length of $\lambda/4$ and a line 1505A having a length of $\lambda/2$. The line 1503A and the line 1506A have substantially L shapes, and one ends of the L shapes are connected to an input terminal 1501A and an output terminal 1502A, respectively. The line 1505A is formed in a layer different from that of the lines 1503A and 1506A. The line 1505A has a crank shape, one end of the line 1505A is capacitively coupled to the other end of the line 1503A, and the other end of the line 1505A is capacitively coupled to the other end of the line 1506A. Additional lines are connected to an end of the line 1503A, which is connected to the input terminal 1501A, and an end of the line 1506A, which is connected to the output terminal 1502A. Characteristics of the filter 150A can thus be adjusted by providing the additional lines between the input terminal 1501A and the output terminal 1502A.

A filter 150B in FIG. 5(c) includes two lines 1503B and 1506B each having a length of $\lambda/4$ and a line 1505B and a line 1508B each having a length of $\lambda/2$. The line 1505B is formed in a layer different from that of the lines 1503B and 1506B. The line 1503B and the line 1506B have substantially C shapes and are connected to an input terminal 1501B and an output terminal 1502B, respectively, at substantially central portions of the C shapes. One ends of the line 1503B and the line 1506B are connected to a ground potential by vias 1504B and 1507B, respectively. The other end of the line 1503B is capacitively coupled to one end of the linear line 1505B, and the other end of the line 1506B is capacitively coupled to the other end of the line 1505B. The line 1508B is a linear line arranged parallel to the line 1505B, and both ends thereof are connected to the ground potential by vias. Characteristics of the filter 150B can be adjusted by providing the line 1508B.

In the first embodiment, a configuration other than the filter illustrated in FIG. 5 may be applied as long as the configuration is a resonant line-type filter.

As described above, since the resonant line-type filter can be easily formed inside the dielectric substrate, it is suitable for a case where the filter is formed in the immediate vicinity of the radiation element. On the other hand, the resonant line-type filter requires a larger area than that when an LC filter realized by a coiled inductor and a capacitor formed by two flat plate electrodes, which is formed in a multilayer substrate, or a chip-type filter mounted on a substrate is used. In the case of the array antenna in which the plurality of radiation elements is arranged, there is a restriction on the interval between the adjacent radiation elements. For this reason, the size of the whole array antenna possibly increases unless the filters are appropriately arranged.

Figure 6:
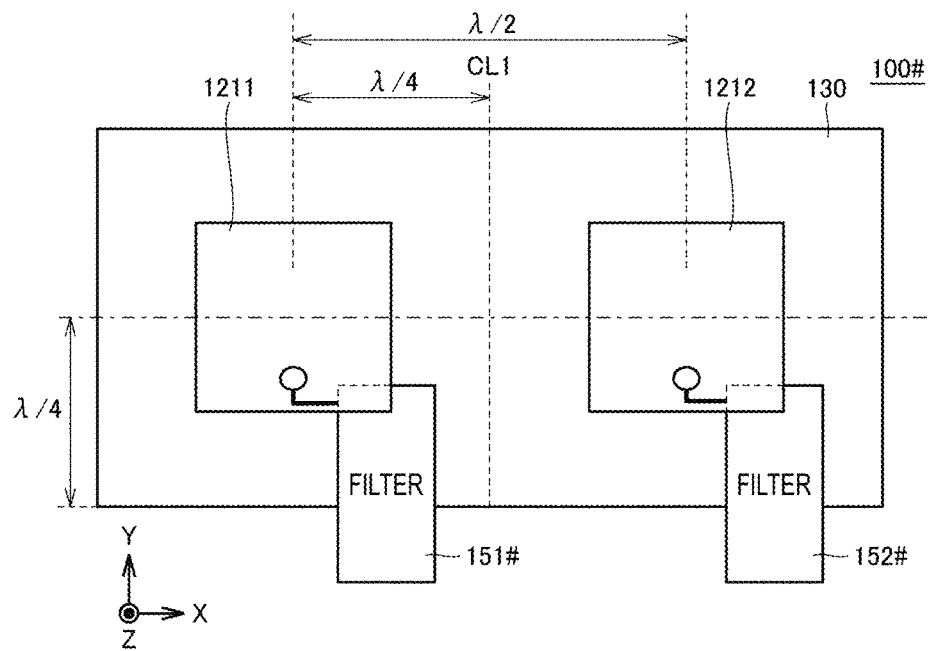
FIG. 6 is a plan perspective view of an antenna module in a comparative example.

FIG. 6 is a plan perspective view of an antenna module 100 #in a comparative example. In the example of the antenna module 100 #, filters 151 #and 152 #are arranged such that positions of the filters with respect to feeding elements are the same, and parts of the filters protrude from regions of $\lambda/4$ from the corresponding feeding elements. In this case, the dielectric substrate 130 needs to be enlarged such that protruding portions are encompassed in the dielectric substrate 130, and the sizes of the antenna module and the whole antenna array increase.

On the other hand, in the antenna module 100 in the first embodiment illustrated in FIG. 2, the two filters are arranged between the feeding elements so as to cross the virtual line equidistant from the feeding elements and are arranged side by side in the direction orthogonal to the array direction of the feeding elements. With such arrangement, the filters can be formed in the regions of the distance of λ/4 from the two feeding elements, so that increase in the size of the antenna module in the array antenna can be suppressed.

(Modification)

Figure 7:
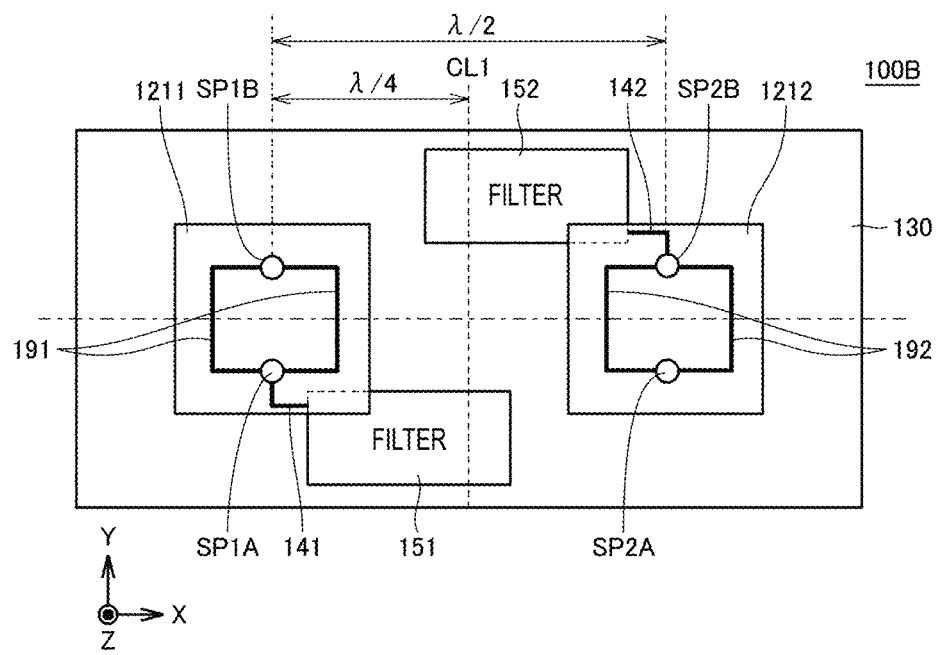
FIG. 7 is a plan perspective view of an antenna module in a modification.

FIG. 7 is a plan perspective view of an antenna module 100B in a modification. The antenna module 100B has a configuration in which a plurality of feeding points for radiating radio waves in the same polarization direction is provided for each feeding element.

To be specific, referring to FIG. 7, a feeding point SP1A and a feeding point SP1B are provided for the feeding element 1211, and a feeding point SP2A and a feeding point SP2B are provided for the feeding element 1212.

The feeding point SP1A is arranged at a position offset from the center of the feeding element 1211 in the negative direction of the Y axis, and the feeding point SP1B is arranged at a position offset from the center of the feeding element 1211 in the positive direction of the Y axis. Similarly, the feeding point SP2A is arranged at a position offset from the center of the feeding element 1212 in the negative direction of the Y axis, and the feeding point SP2B is arranged at a position offset from the center of the feeding element 1212 in the positive direction of the Y axis. That is, the feeding points SP1B and SP2B are arranged at positions offset from the center points (plane centers) of the feeding elements in the direction opposite to the offset direction of the feeding points SP1A and SP2A.

All of the feeding points SP1A, SP1B, SP2A, and SP2B are offset in the Y-axis direction from the center points of the feeding elements. Therefore, when radio frequency signals are supplied to these feeding points, radio waves having the polarization direction being the Y-axis direction are emitted from the feeding elements.

The feeding point SP1A is connected to the feeding point SP1B by lines 191. Further, the feeding point SP2A is connected to the feeding point SP2B by lines 192. When the wavelength of the radio waves that are radiated from each radiation element is λ, the lengths of the lines 191 and 192 are set to be λ/2. Accordingly, the phase of the radio frequency signal that is supplied to the feeding point SP1B is inverted with respect to the phase of the radio frequency signal that is supplied to the feeding point SP1A. Similarly, the phase of the radio frequency signal that is supplied to the feeding point SP2B is inverted with respect to the phase of the radio frequency signal that is supplied to the feeding point SP2A. This makes it possible to improve the cross polarization discrimination (XPD) indicating the degree of separation between main polarization and cross polarization in each feeding element.

In the antenna module 100B, a radio frequency signal from the filter 151 corresponding to the feeding element 1211 is supplied to the feeding point SP1A after passing through the feeding wiring 141. On the other hand, a radio frequency signal from the filter 152 corresponding to the feeding element 1212 is supplied to the feeding point SP2B after passing through the feeding wiring 142.

When the antenna module 100B is viewed in plan (from the radiating side of the radiation elements), the filter 151 and the filter 152 are arranged side by side in a second direction (Y-axis direction) orthogonal to a first direction (positive direction of the X axis) toward the feeding element 1212 from the feeding element 1211. With such arrangement, the filters can be formed in the regions of the distance of λ/4 from the two feeding elements, so that increase in the size of the antenna module in the array antenna can be suppressed.

In the first embodiment and the modification, the "feeding element 1211" and the "feeding element 1212" correspond to a "first radiation element" and a "second radiation element" in the present disclosure, respectively, and the "filter 151" and the "filter 152" correspond to a "first filter" and a "second filter" in the present disclosure, respectively.

Second Embodiment

In the first embodiment, the configuration has been described in which the radio waves having one polarization direction are radiated from each radiation element. A second embodiment describes filter arrangement in the case of a so-called dual polarization type in which two radio waves having different polarization directions can be radiated from each radiation element.

(Basic Configuration of Communication Apparatus)

Figure 8:
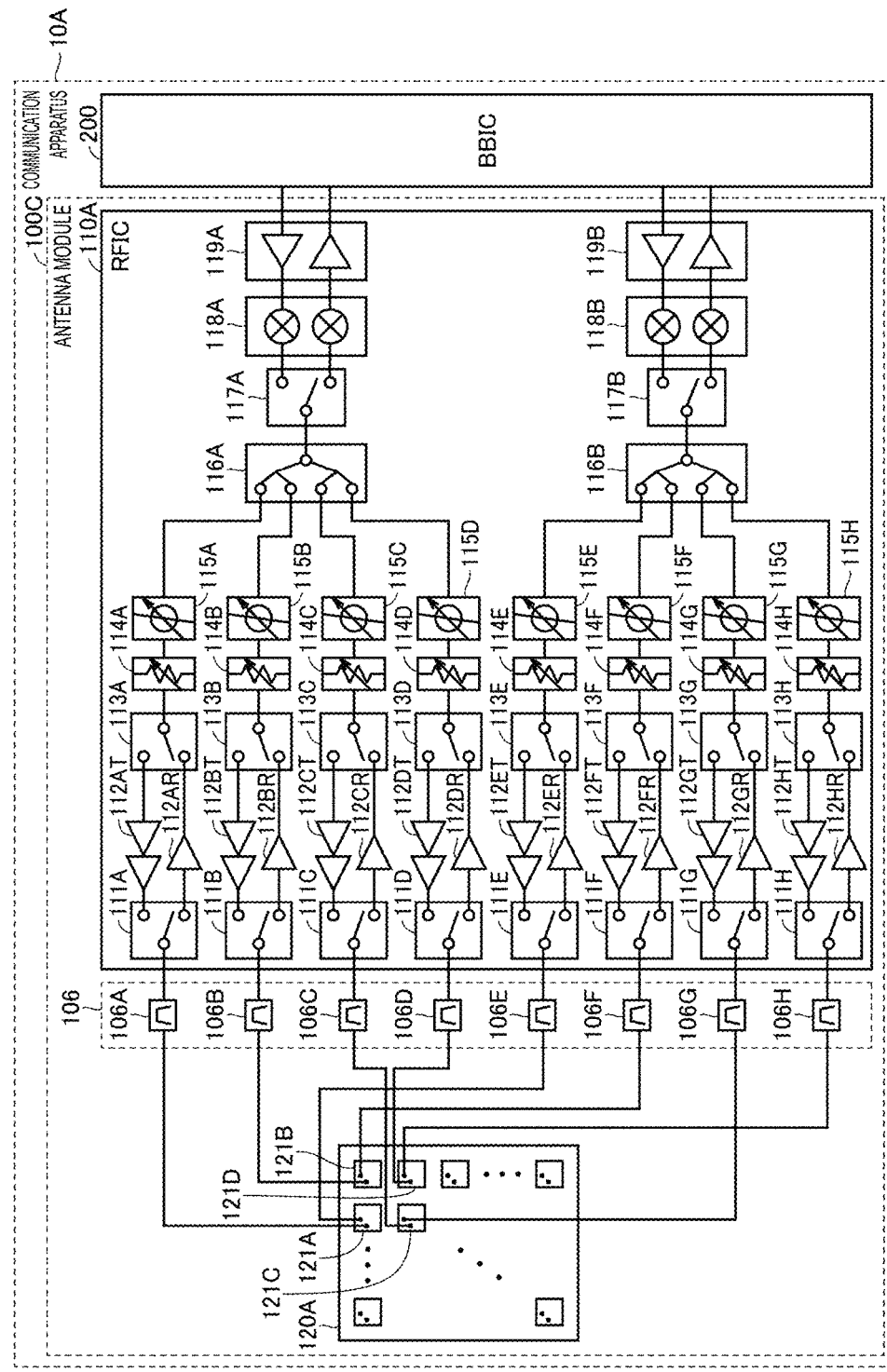
FIG. 8 is a block diagram of a communication apparatus to which an antenna module according to a second embodiment is applied.

FIG. 8 is a block diagram of a communication apparatus to which an antenna module according to the second embodiment is applied. Referring to FIG. 8, a communication apparatus 10A includes an antenna module 100C and the BBIC 200. The antenna module 100C includes an RFIC 110A, an antenna device 120A, and a filter device 106.

The antenna device 120A is a dual polarization-type antenna device, and a radio frequency signal for first polarization and a radio frequency signal for second polarization are supplied to each feeding element 121 from the RFIC 110A.

The RFIC 110A includes switches 111A to 111H, 113A to 113H, 117A, and 117B, power amplifiers 112AT to 112HT, low noise amplifiers 112AR to 112HR, attenuators 114A to 114H, phase shifters 115A to 115H, signal multiplexers/demultiplexers 116A and 116B, mixers 118A and 118B, and amplifier circuits 119A and 119B. Among them, the configurations of the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal multiplexer/demultiplexer 116A, the mixer 118A, and the amplifier circuit 119A are circuits for the radio frequency signals for the first polarization. The configurations of the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal multiplexer/demultiplexer 116B, the mixer 118B, and the amplifier circuit 119B are circuits for the radio frequency signals for the second polarization.

When the radio frequency signals are transmitted, the switches 111A to 111H and 113A to 113H are switched to the side of the power amplifiers 112AT to 112HT, and the switches 117A and 117B are connected to transmission-side amplifiers of the amplifier circuits 119A and 119B. When the radio frequency signals are received, the switches 111A to 111H and 113A to 113H are switched to the side of the low noise amplifiers 112AR to 112HR, and the switches 117A and 117B are connected to reception-side amplifiers of the amplifier circuits 119A and 119B.

The filter device 106 includes filters 106A to 106H. The filters 106A to 106H are connected to the switches 111A to 111H in the RFIC 110A, respectively. Each of the filters 106A to 106H has a function of attenuating radio frequency signals in a specific frequency band.

The signals transmitted from the BBIC 200 are amplified by the amplifier circuits 119A and 119B and up-converted by the mixers 118A and 118B. The transmission signals, which are the up-converted radio frequency signals, are divided into four by the signal multiplexers/demultiplexers 116A and 116B, pass through corresponding signal paths, and are fed to the respective different feeding elements 121.

The radio frequency signals from the switches 111A and 111E are supplied to a feeding element 121A after passing through the filters 106A and 106E, respectively. Similarly, the radio frequency signals from the switches 111B and 111F are supplied to a feeding element 121B after passing through the filters 106B and 106F, respectively. The radio frequency signals from the switches 111C and 111G are supplied to a feeding element 121C after passing through the filters 106C and 106G, respectively. The radio frequency signals from the switches 111D and 111H are supplied to a feeding element 121D after passing through the filters 106D and 106H, respectively.

The directivity of the antenna device 120A can be adjusted by individually adjusting the phase shift degrees of the phase shifters 115A to 115H arranged on the respective signal paths.

The reception signals, which are radio frequency signals received by the feeding elements 121, are transmitted to the RFIC 110 after passing through the filter device 106. Then, the reception signals pass through four different signal paths and are multiplexed in the signal multiplexers/demultiplexers 116A and 116B. The multiplexed reception signals are down-converted by the mixers 118A and 118B, amplified by the amplifier circuits 119A and 119B, and transmitted to the BBIC 200.

(Configuration of Antenna Module)

Figure 9:
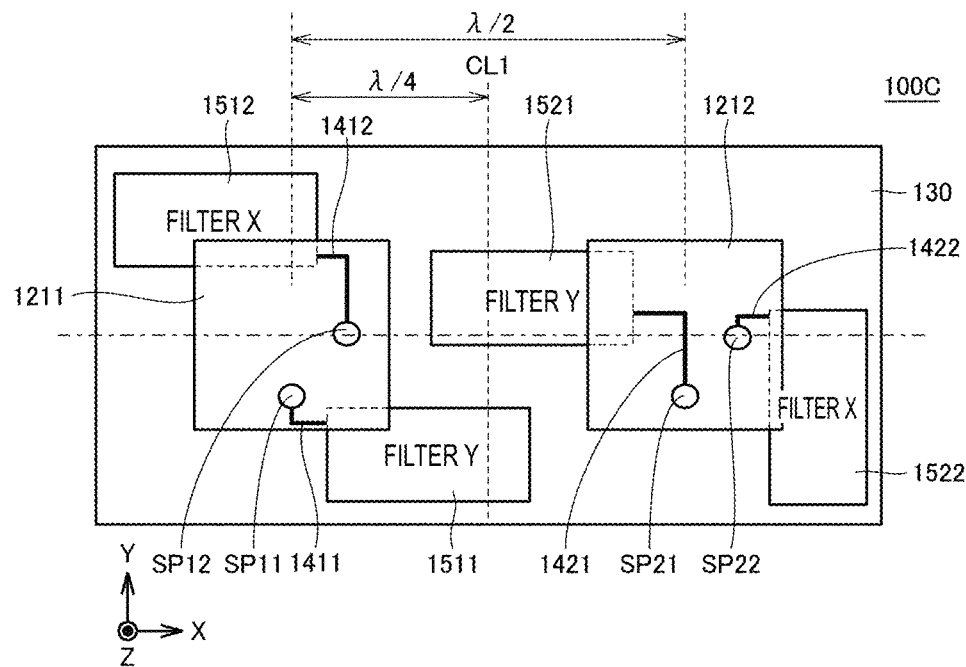
FIG. 9 is a plan perspective view of a first example of the antenna module in FIG. 8.

FIG. 9 is an example of a plan perspective view of the antenna module 100C in FIG. 8. Referring to FIG. 9, the antenna module 100C has a configuration in which radio wave filters 1512 and 1522 (filters X) having polarization directions being the X-axis direction are added to the configuration of the antenna module 100 in the first embodiment described with reference to FIG. 2. Filters 1511 and 1521 (filters Y) having polarization directions being the Y-axis direction in FIG. 9 correspond to the filters 151 and 152 in FIG. 2. All of the filters 1511, 1512, 1521, and 1522 are the resonant line-type filters.

In the feeding element 1211, the radio frequency signal that has passed through the filter 1511 is supplied to a feeding point SP11 after passing through feeding wiring 1411, and the radio frequency signal that has passed through the filter 1512 is supplied to a feeding point SP12 after passing through feeding wiring 1412. In the feeding element 1212, the radio frequency signal that has passed through the filter 1512 is supplied to a feeding point SP21 after passing through feeding wiring 1421, and the radio frequency signal that has passed through the filter 1522 is supplied to a feeding point SP22 after passing through feeding wiring 1422.

The feeding points SP11 and SP21 are arranged at positions offset from the centers of the feeding elements in the negative direction of the Y axis. When the radio frequency signals are supplied to the feeding points SP11 and SP21, radio waves having the polarization directions being the Y-axis direction are radiated from each of the feeding elements. Further, the feeding points SP12 and SP22 are arranged at positions offset from the centers of the feeding elements in the positive direction of the X axis. When the radio frequency signals are supplied to the feeding points SP12 and SP22, radio waves having the polarization directions being the X-axis direction are radiated from each of the feeding elements.

Each of the filters 1511, 1512, 1521, and 1522 is arranged in a layer between the lower surface 132 of the dielectric substrate 130 and the ground electrode GND as illustrated in FIG. 3 in the first embodiment or in a layer between the feeding elements 1211 and 1212 and the ground electrode GND as illustrated in FIG. 4.

Similarly to the filters 151 and 152 in the first embodiment, the filters 1511 and 1521 are arranged so as to cross the virtual line CL1 equidistant from the feeding element 1211 and the feeding element 1212 when the antenna module 100C is viewed in plan from the normal direction. The filter 1511 and the filter 1521 are arranged side by side in a second direction (negative direction of the Y-axis) orthogonal to a first direction (positive direction of the X axis) toward the feeding element 1212 from the feeding element 1211. The filter 1511 is arranged further on the second direction side with respect to the feeding point SP11, and the filter 1512 is arranged in the direction (positive direction of the Y axis) opposite to the second direction with respect to the feeding point SP12.

The filter 1512 for polarization in the X-axis direction for the feeding element 1211 is arranged in the direction (negative direction of the X axis) opposite to the first direction with respect to the feeding point SP12 in a region in the direction (positive direction of the Y axis) opposite to the second direction with respect to the center of the feeding element 1211. On the other hand, the filter 1522 for polarization in the X-axis direction for the feeding element 1212 is arranged in a region in the first direction (positive direction of the X axis) with respect to the center of the feeding element 1212.

With such arrangement, all of the filters 1511, 1512, 1521, and 1522 can be arranged in the regions of the distance of λ/4 from the feeding elements 1211 and 1212, so that increase in the size of the antenna module in the array antenna can be suppressed.

In the antenna module 100C in FIG. 9, the "filter 1511" and the "filter 1521" correspond to the "first filter" and the "second filter", respectively, in the present disclosure, and the "filter 1512" and the "filter 1522" correspond to a "third filter" and a "fourth filter", respectively, in the present disclosure.

Note that the filters arranged in the region between the feeding elements 1211 and 1212 are not required to be the filters for the same polarization. For example, as in an antenna module 100C1 illustrated in FIG. 10, the filter 1511 for polarization in the Y-axis direction for the feeding element 1211 and the filter 1522 for polarization in the X-axis direction for the feeding element 1212 may be arranged in the region between the feeding elements 1211 and 1212. Although not illustrated in the drawing, the filter 1512 for polarization in the X-axis direction for the feeding element 1211 and the filter 1521 for polarization in the Y-axis direction for the feeding element 1212 may be arranged in the region between the feeding elements 1211 and 1212.

Figure 10:
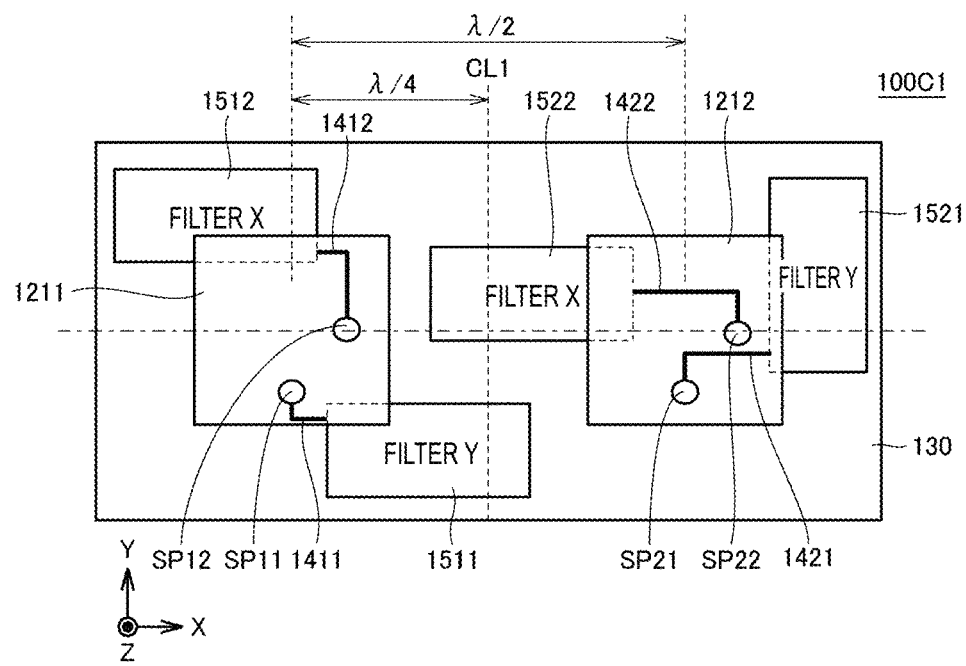
FIG. 10 is a plan perspective view of a second example of the antenna module in FIG. 8.

In the antenna module 100C1 in FIG. 10, the "filter 1511" and the "filter 1522" correspond to the "first filter" and the "second filter", respectively, in the present disclosure, and the "filter 1512" and the "filter 1521" correspond to the "third filter" and the "fourth filter", respectively, in the present disclosure.

As described above, in the dual polarization-type antenna module as well, all of the filters can be formed in the regions of the distance of λ/4 from the two feeding elements by arranging any filter for one radiation element and any filter for the other radiation element side by side in the direction orthogonal to the array direction of the feeding elements. Therefore, increase in the size of the antenna module in the array antenna can be suppressed.

Third Embodiment

In the first embodiment, the configuration has been described in which the radio waves in one frequency band are radiated from each radiation element. A third embodiment describes filter arrangement in the case of a so-called dual band-type in which two radio waves having different frequency bands can be radiated from each radiation element with reference to FIGS. 11 to 13.

Figure 11:
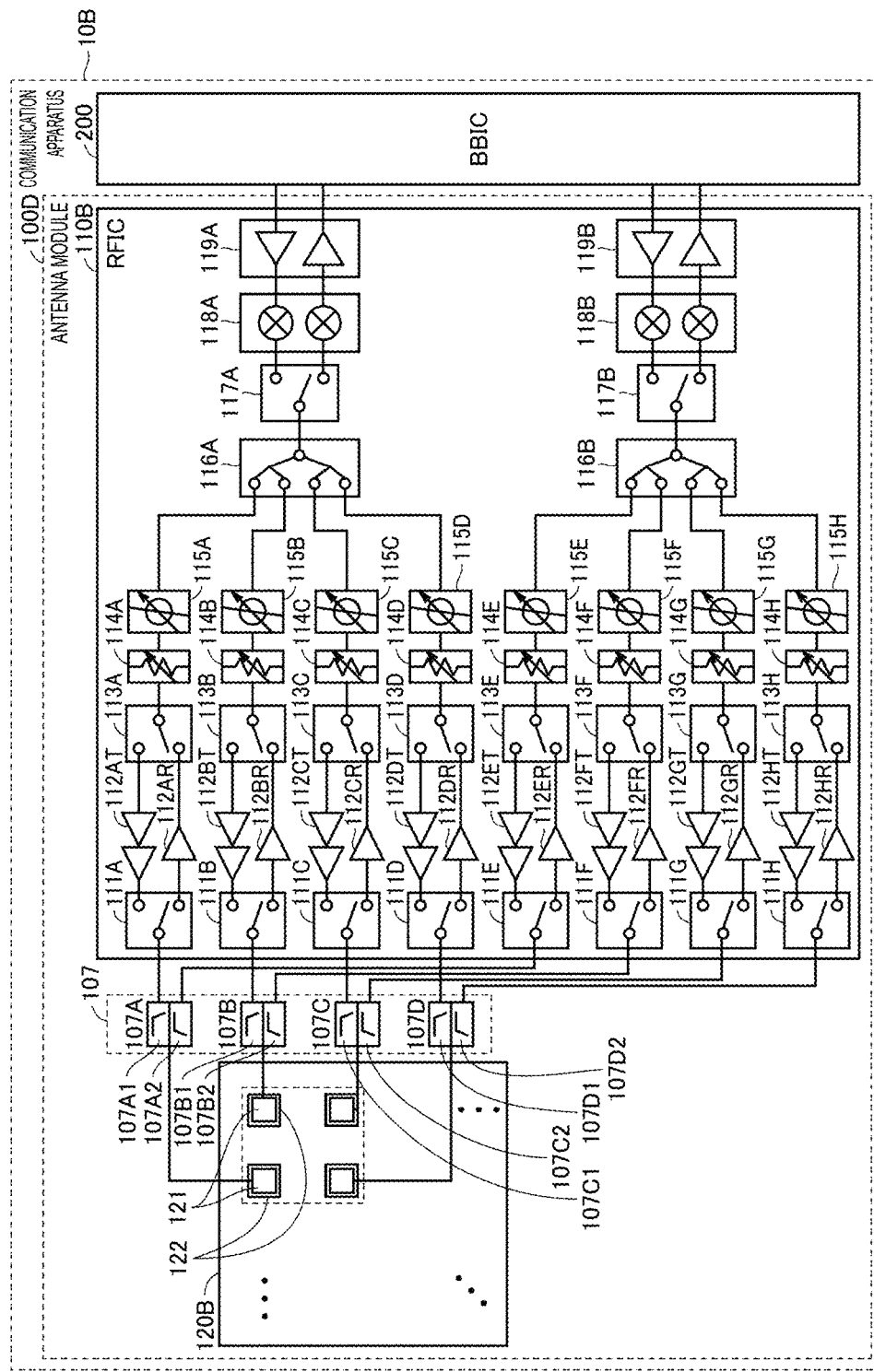
FIG. 11 is a block diagram of a communication apparatus to which an antenna module according to a third embodiment is applied.
Figure 12:
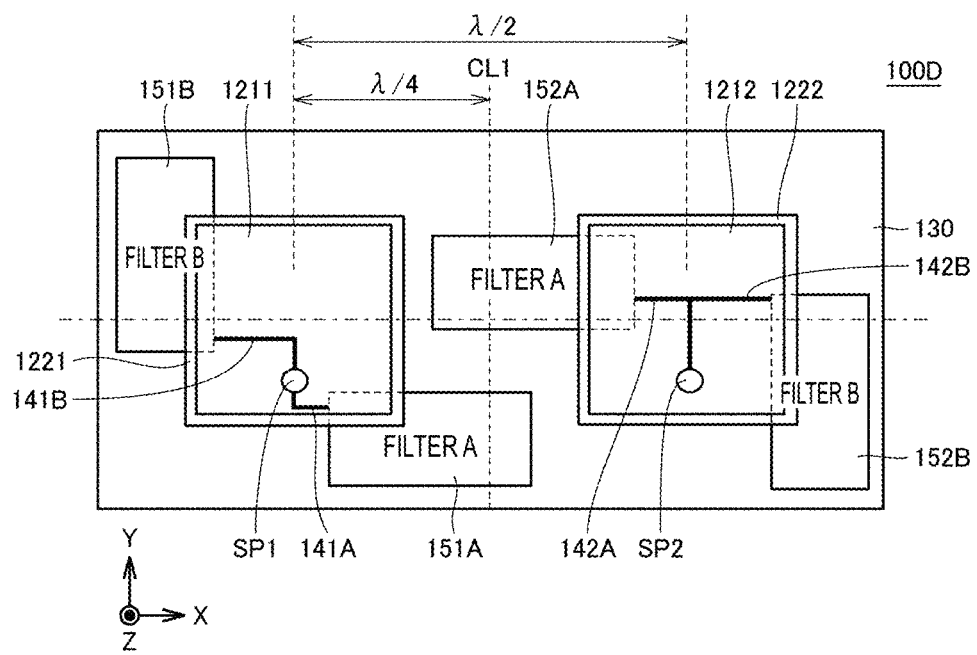
FIG. 12 is a plan perspective view of the antenna module in FIG. 11.
Figure 13:
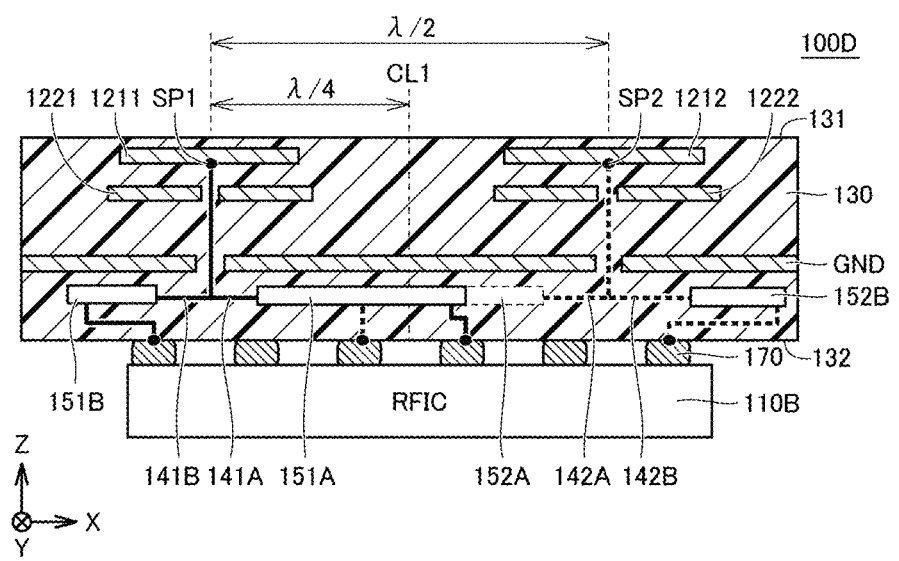
FIG. 13 is a side perspective view of the antenna module in FIG. 11.

FIG. 11 is a block diagram of a communication apparatus 10B to which an antenna module 100D according to the third embodiment is applied. FIGS. 12 and 13 are a plan perspective view and a side perspective view, respectively, of an antenna module including two radiation elements.

Referring to FIG. 11, the communication apparatus 10B includes the antenna module 100D and the BBIC 200. The antenna module 100D includes an RFIC 110B, an antenna device 120B, and a filter device 107.

The antenna device 120B includes, as radiation elements, the plurality of feeding elements 121 and parasitic elements 122 provided so as to correspond to the respective feeding elements 121. The antenna device 120B is a so-called dual band-type antenna device capable of radiating radio waves in two different frequency bands.

As illustrated in FIGS. 12 and 13, the antenna module 100D includes, as radiation elements, the feeding elements 1211 and 1212 and parasitic elements 1221 and 1222. The parasitic element 1221 is arranged in a layer between the feeding element 1211 and the ground electrode GND in the dielectric substrate 130. Feeding wiring 141A penetrates through the parasitic element 1221 and is connected to the feeding point SP1 of the feeding element 1211. Similarly, the parasitic element 1222 is arranged in a layer between the feeding element 1212 and the ground electrode GND in the dielectric substrate 130. Feeding wiring 142A penetrates through the parasitic element 1222 and is connected to the feeding point SP2 of the feeding element 1212.

The sizes of the parasitic elements 1221 and 1222 are larger than the sizes of the feeding elements 1211 and 1212. Therefore, the resonant frequencies of the parasitic elements 1221 and 1222 are lower than the resonant frequencies of the feeding elements 1211 and 1212. Radio waves having frequencies lower than those of the feeding elements 1211 and 1212 can be radiated from the parasitic elements 1221 and 1222 by supplying radio frequency signals corresponding to the resonant frequencies of the parasitic elements 1221 and 1222 to the feeding wiring 141A and the feeding wiring 142A, respectively.

The RFIC 110B is configured to be able to supply radio frequency signals in two frequency bands. Since the configuration of the RFIC 110B is basically similar to that of the RFIC 110A described in the second embodiment, detailed description thereof will not be repeated. In the RFIC 110B, the configurations of the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal multiplexer/demultiplexer 116A, the mixer 118A, and the amplifier circuit 119A in FIG. 11 are circuits for the radio frequency signals in a low frequency band. The configurations of the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal multiplexer/demultiplexer 116B, the mixer 118B, and the amplifier circuit 119B in FIG. 11 are circuits for the radio frequency signals in a high frequency band.

The filter device 107 includes diplexers 107A to 107D. Each diplexer includes a low pass filter (filter 107A1, 107B1, 107C1, or 107D1) that transmits the radio frequency signals in the low frequency band and a high pass filter (filter 107A2, 107B2, 107C2, or 107D2) that transmits the radio frequency signals in the high frequency band. The filters 107A1, 107B1, 107C1, and 107D1 are respectively connected to the switches 111A to 111D in the RFIC 110B. The filters 107A2, 107B2, 107C2, and 107D2 are respectively connected to the switches 111E to 111H in the RFIC 110B. Each of the diplexers 107A to 107D is connected to the corresponding feeding element 121.

Transmission signals from the switches 111A to 111D in the RFIC 110B are radiated from the corresponding parasitic elements 122 after passing through the filters 107A1 to 107D1, respectively. Transmission signals from the switches 111E to 111H in the RFIC 110B are radiated from the corresponding feeding elements 121 after passing through the filters 107A2 to 107D2, respectively.

In FIGS. 12 and 13, for example, filters 151A and 152A correspond to the high pass filters of the diplexers, and filters 151B and 152B correspond to the low pass filters of the diplexers. The radio frequency signals in the high frequency band from the RFIC 110B are supplied to the feeding point SP1 of the feeding element 1211 after passing through the filter 151A and the feeding wiring 141A and supplied to the feeding point SP2 of the feeding element 1212 after passing through the filter 152A and the feeding wiring 142A. The radio frequency signals in the low frequency band from the RFIC 110B are supplied to the feeding point SP1 of the feeding element 1211 after passing through the filter 151B and the feeding wiring 141B and supplied to the feeding point SP2 of the feeding element 1212 after passing through the filter 152B and the feeding wiring 142B.

Each of the filters 151A, 151B, 152A, and 152B is arranged in a layer between the lower surface 132 of the dielectric substrate 130 and the ground electrode GND or in a layer between the parasitic element 1221 or 1222 and the ground electrode GND.

In such a dual band-type antenna module as well, as illustrated in FIG. 12, all of the filters can be formed in the regions of the distance λ/4 from two feeding elements by arranging one of the filters 151A and 151B for the feeding element 1211 and one of the filters 152A and 152B for the feeding element 1212 so as to cross the virtual line CL1 equidistant from the feeding element 1211 and the feeding element 1212 and arranging them side by side in a second direction (negative direction of the Y axis) orthogonal to a first direction (positive direction of the X axis) toward the feeding element 1212 from the feeding element 1211. Therefore, increase in the size of the antenna module in the array antenna can be suppressed.

In the antenna module 100D in FIG. 12, the "feeding element 1211" and the "parasitic element 1221" correspond to the "first radiation element" in the present disclosure, and the "feeding element 1212" and the "parasitic element 1222" correspond to the "second radiation element" in the present disclosure. In the antenna module 100D, the "filter 151A"

and the "filter 152A" correspond to the "first filter" and the "second filter", respectively, in the present disclosure, and the "filter 151B" and the "filter 152B" correspond to the "third filter" and the "fourth filter", respectively, in the present disclosure.

Fourth Embodiment

Figure 14:
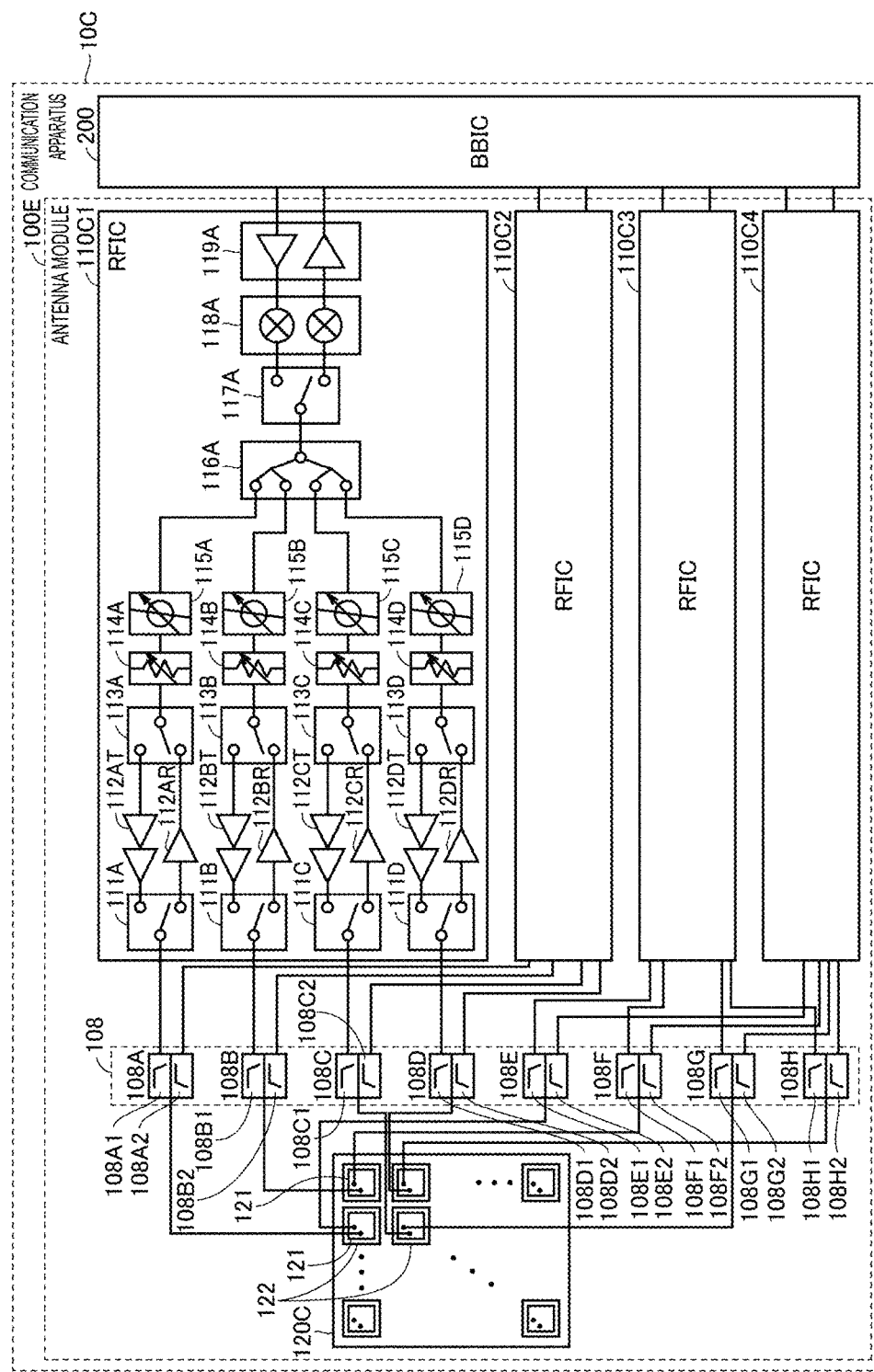
FIG. 14 is a block diagram of a communication apparatus to which an antenna module according to a fourth embodiment is applied.
Figure 15:
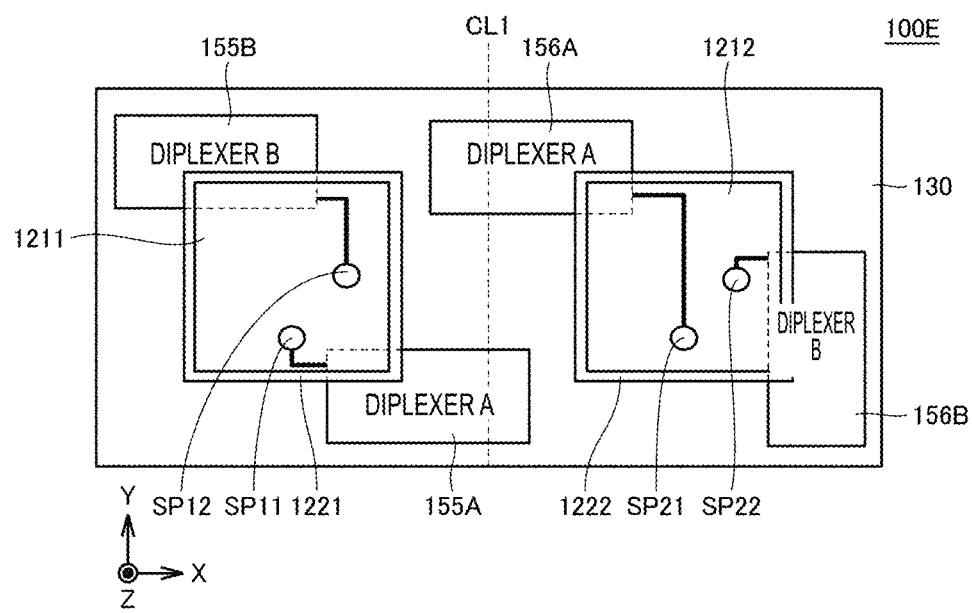
FIG. 15 is a plan perspective view of the antenna module in FIG. 14.

A fourth embodiment describes a case of a dual polarization/dual band-type antenna module obtained by combining the second embodiment and the third embodiment with reference to FIGS. 14 and 15.

FIG. 14 is a block diagram of a communication apparatus 10C to which an antenna module 100E according to the fourth embodiment is applied.

Referring to FIG. 14, the communication apparatus 10C includes the antenna module 100E and the BBIC 200. The antenna module 100E includes RFICs 110C1 to 110C4, an antenna device 120C, and a filter device 108.

The antenna device 120C includes, as radiation elements, the plurality of feeding elements 121 and the parasitic elements 122 provided so as to correspond to the feeding elements 121. In addition, a radio frequency signal for first polarization and a radio frequency signal for second polarization are supplied to each feeding element 121. The antenna device 120C is an antenna device capable of radiating radio waves in two different frequency bands in two different polarization directions.

As in FIG. 13, each of the parasitic elements 122 is arranged in a layer between the corresponding feeding element 121 and the ground electrode GND. Radio frequency signals from each RFIC are transmitted to the corresponding feeding elements after passing through feeding wiring lines that penetrate through the parasitic elements 122 and reach each of the feeding elements.

The antenna module 100E includes the RFICs 110C1 and 110C3 for supplying radio frequency signals in a low frequency band and the RFICs 110C2 and 110C4 for supplying radio frequency signals in a high frequency band. The RFIC 110C1 and RFIC 110C2 are circuits for the radio frequency signals for the first polarization, and the RFIC 110C3 and the RFIC 110C4 are circuits for the radio frequency signals for the second polarization. Since the configurations of the RFICs are the same, FIG. 14 illustrates only the circuit configuration of the RFIC 110C1 and omits illustration of the circuit configurations of the RFICs 110C2 to 110C4. Since the configuration of each RFIC is similar to that of the RFIC 110 in FIG. 1, detailed description thereof will not be repeated.

The filter device 108 includes diplexers 108A to 108H. Each of the diplexers includes a low pass filter (any of filters 108A1 to 108H1) that transmits the radio frequency signals in the low frequency band and a high pass filter (any of filters 108A2 to 108H2) that transmits the radio frequency signals in the high frequency band. Each of the filters 108A1 to 108H1 is connected to a corresponding switch in the RFIC. Output of each of the diplexers 108A to 108H is connected to the corresponding feeding element 121. All of the filters included in the diplexers 108A to 108H are resonant line-type filters.

FIG. 15 is a plan perspective view of the antenna module 100E including two radiation elements. Referring to FIG. 15, the antenna module 100E includes, as radiation elements, the feeding elements 1211 and 1212 and the parasitic elements 1221 and 1222. As in FIG. 13 in the third embodiment, in the dielectric substrate 130, the parasitic element 1221 is arranged in the layer between the feeding element 1211 and the ground electrode GND, and the parasitic element 1222 is arranged in the layer between the feeding element 1212 and the ground electrode GND.

A radio frequency signal from a diplexer 155A is supplied to the feeding point SP11 of the feeding element 1211, and a radio frequency signal from a diplexer 155B is supplied to the feeding point SP12. Similarly, a radio frequency signal from a diplexer 156A is supplied to the feeding point SP21 of the feeding element 1212, and a radio frequency signal from a diplexer 156B is supplied to the feeding point SP22.

The diplexers 155A, 155B, 156A, and 156B in FIG. 15 correspond to the diplexers included in the filter device 108 in FIG. 14. Each diplexer is arranged in a layer between the lower surface 132 of the dielectric substrate 130 and the ground electrode GND or in a layer between the parasitic element 1221 or 1222 and the ground electrode GND.

The diplexer 155A and the diplexer 156A are arranged so as to cross the virtual line CL1 equidistant from the feeding element 1211 and the feeding element 1212 and are arranged side by side in a second direction (negative direction of the Y axis) orthogonal to a first direction (positive direction of the X axis) toward the feeding element 1212 from the feeding element 1211.

The diplexer 155B for polarization in the X-axis direction for the feeding element 1211 is arranged in the direction (negative direction of the X axis) opposite to the first direction with respect to the feeding point SP12 in a region in the direction (positive direction of the Y axis) opposite to the second direction with respect to the center of the feeding element 1211. On the other hand, the diplexer 156B for polarization in the X-axis direction for the feeding element 1212 is arranged in a region in the first direction (positive direction of the X-axis) with respect to the center of the feeding element 1212.

All of the diplexers 155A, 155B, 156A, and 156B can be arranged in the regions of the distance of λ/4 from the feeding elements 1211 and 1212 by arranging the diplexers in this manner, so that increase in the size of the antenna module in the array antenna can be suppressed.

Also in the fourth embodiment, the diplexers arranged between the feeding element 1211 and the feeding element 1212 may be the diplexers 155B and 156B or diplexers for different polarizations.

In the antenna module 100E in the fourth embodiment, the dual band-type antenna module in which the feeding elements 1211 and 1212 and the parasitic elements 1221 and 1222 are stacked has been described. However, a dual band-type antenna module may be configured by using radiation elements in which two feeding elements are stacked by replacing the parasitic elements 1221 and 1222 with the feeding elements.

In the antenna module 100E in FIG. 15, the "feeding element 1211" and the "parasitic element 1221" correspond to the "first radiation element" in the present disclosure, and the "feeding element 1212" and the "parasitic element 1222" correspond to the "second radiation element" in the present disclosure. In addition, in the antenna module 100E, the "diplexer 155A" and the "diplexer 156A" correspond to the "first filter" and the "second filter" in the present disclosure, respectively, and the "diplexer 155B" and the "diplexer 156B" correspond to the "third filter" and the "fourth filter" in the present disclosure, respectively.

Fifth Embodiment

In the above-described embodiments, the configuration has been described in which the radio frequency signal that has passed through each filter is supplied to one corresponding feeding element. A fifth embodiment describes a case where a radio frequency signal from each filter is supplied to a plurality of feeding elements.

Figure 16:
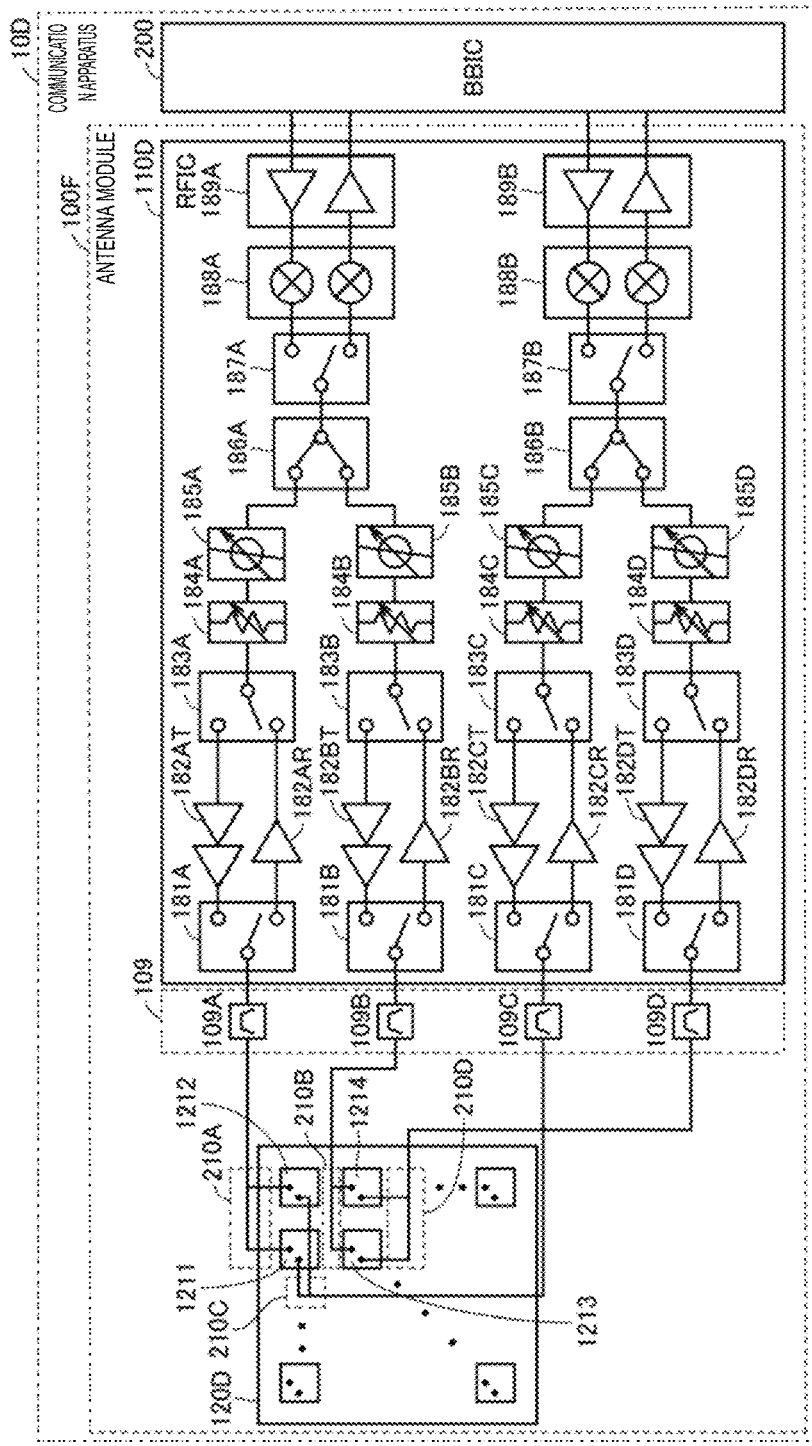
FIG. 16 is a block diagram of a communication apparatus to which an antenna module according to a fifth embodiment is applied.

FIG. 16 is a block diagram of a communication apparatus 10D to which an antenna module 100F according to the fifth embodiment is applied.

Referring to FIG. 16, the communication apparatus 10D includes the antenna module 100F and the BBIC 200. The antenna module 100F includes an RFIC 110D, an antenna device 120D, and a filter device 109.

The antenna device 120D includes the plurality of feeding elements 121 as radiation elements. The antenna device 120D is a dual polarization-type antenna device as in the second embodiment, and a radio frequency signal for first polarization and a radio frequency signal for second polarization are supplied from the RFIC 110D to each feeding element 121.

The RFIC 110D includes switches 181A to 181D, 183A to 183D, 187A, and 187B, power amplifiers 182AT to 182DT, low noise amplifiers 182AR to 182DR, attenuators 184A to 184D, phase shifters 185A to 185D, signal multiplexers/demultiplexers 186A and 186B, mixers 188A and 188B, and amplifier circuits 189A and 189B. Among them, the configurations of the switches 181A, 181B, 183A, 183B, and 187A, the power amplifiers 182AT and 182BT, the low noise amplifiers 182AR and 182BR, the attenuators 184A and 184B, the phase shifters 185A and 185B, the signal multiplexer/demultiplexer 186A, the mixer 188A, and the amplifier circuit 189A are circuits for the radio frequency signals for the first polarization. In addition, the configurations of the switches 181C, 181D, 183C, 183D, and 187B, the power amplifiers 182CT and 182DT, the low noise amplifiers 182CR and 182DR, the attenuators 184C and 184D, the phase shifters 185C and 185D, the signal multiplexer/demultiplexer 186B, the mixer 188B, and the amplifier circuit 189B are circuits for the radio frequency signals for the second polarization.

When the radio frequency signal is transmitted, the switches 181A to 181D and 183A to 183D are switched to the side of the power amplifiers 182AT to 182DT, and the switches 187A and 187B are connected to transmission-side amplifiers of the amplifier circuits 189A and 189B. When the radio frequency signals are received, the switches 181A to 181D and 183A to 183D are switched to the side of the low noise amplifiers 182AR to 182DR, and the switches 187A and 187B are connected to reception-side amplifiers of the amplifier circuits 189A and 189B.

The filter device 109 includes filters 109A to 109D. The filters 109A to 109D are respectively connected to the switches 181A to 181D in the RFIC 110D. Each of the filters 109A to 109D has a function of attenuating the radio frequency signals in a specific frequency band.

The signals transmitted from the BBIC 200 are amplified by the amplifier circuits 189A and 189B and up-converted by the mixers 188A and 188B. The transmission signals, which are up-converted radio frequency signals, are divided into two by the signal multiplexers/demultiplexers 186A and 186B, pass through corresponding signal paths, and are fed to the feeding elements 121.

The radio frequency signal from the switch 181A passes through the filter 109A and is branched into two systems by a branch circuit 210A to be supplied to the feeding element 121A and the feeding element 121B. The radio frequency signal from the switch 181B passes through the filter 109B and is branched into two systems by a branch circuit 210B to be supplied to the feeding element 121C and the feeding element 121D. The radio frequency signal from the switch 181C passes through the filter 109C and is branched into two systems by a branch circuit 210C to be supplied to the feeding element 121A and the feeding element 121B. The radio frequency signal from the switch 181D passes through the filter 109D and is branched into two systems by a branch circuit 210D to be supplied to the feeding element 121C and the feeding element 121D.

The directivity of the antenna device 120D can be adjusted by individually adjusting the phase shift degrees of the phase shifters 185A to 185D arranged on the respective signal paths.

In such an antenna module, one filter is provided for two feeding elements for each polarization.

Figure 17:
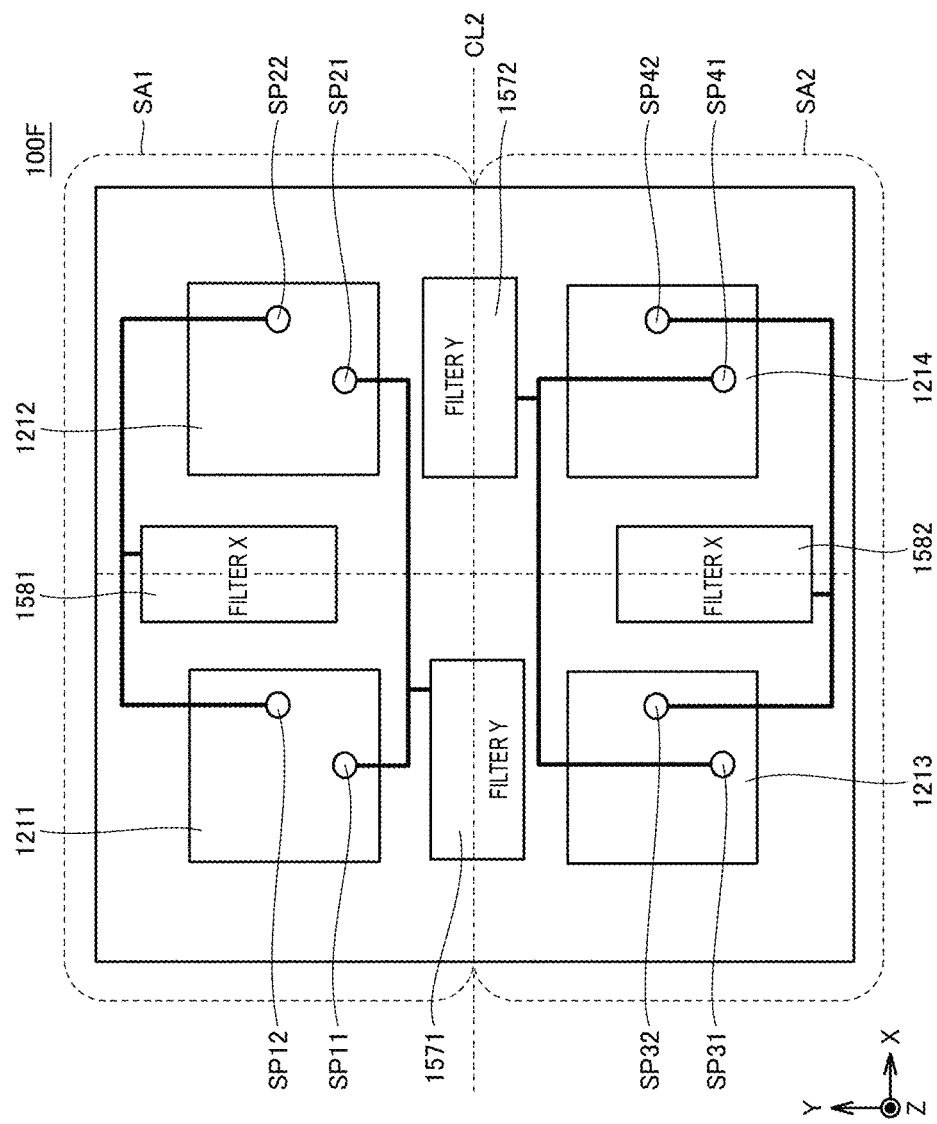
FIG. 17 is a plan perspective view of the antenna module in FIG. 16.

FIG. 17 is a plan perspective view of the antenna module 100F. Referring to FIG. 17, the antenna module 100F includes feeding elements 1211 to 1214 as radiation elements. Further, the antenna module 100F includes filters 1571, 1572, 1581, and 1582. All of the filters 1571, 1572, 1581, and 1582 are resonant line-type filters and correspond to the filters included in the filter device 109 in FIG. 16.

The feeding elements 1211 to 1214 are two-dimensionally arrayed in 2×2. The feeding element 1211 and the feeding element 1212 form a sub antenna SA1 arrayed in 1×2. Further, the feeding element 1213 and the feeding element 1214 form a sub antenna SA2 arrayed in 1×2. That is, the array antenna has a configuration in which the sub antennas SA1 and SA2 are arranged adjacent to each other. Assuming that a direction (negative direction of the Y axis) toward the sub antenna SA2 from the sub antenna SA1 is a first direction, the feeding elements included in each sub antenna are arrayed in a second direction (X-axis direction) orthogonal to the first direction.

Each of the filter 1571 and the filter 1581 is connected to the feeding elements 1211 and 1212 included in the sub antenna SA1. The radio frequency signal that has passed through the filter 1571 is supplied to the feeding point SP11 of the feeding element 1211 and the feeding point SP21 of the feeding element 1212. The radio frequency signal that has passed through the filter 1581 is supplied to the feeding point SP12 of the feeding element 1211 and the feeding point SP22 of the feeding element 1212.

Each of the filter 1572 and the filter 1582 is connected to the feeding elements 1213 and 1214 included in the sub antenna SA2. The radio frequency signal that has passed through the filter 1572 is supplied to a feeding point SP31 of the feeding element 1213 and a feeding point SP41 of the feeding element 1214. The radio frequency signal that has passed through the filter 1582 is supplied to a feeding point SP32 of the feeding element 1213 and a feeding point SP42 of the feeding element 1214.

The feeding points SP11, SP21, SP31, and SP41 are arranged at positions offset from the centers of the feeding elements in the negative direction of the Y axis. When the radio frequency signals are supplied to the feeding points SP11, SP21, SP31, and SP41, radio waves having the polarization direction being the Y-axis direction are radiated from each of the feeding elements. Further, the feeding points SP12, SP22, SP32, and SP42 are arranged at positions offset from the centers of the feeding elements in the positive direction of the X axis. When the radio frequency signals are supplied to the feeding points SP12, SP22, SP32, and SP42, radio waves having the polarization direction being the X-axis direction are radiated from each of the feeding elements.

When the antenna module 100F is viewed in plan from the normal direction, the filters 1571 and 1572 are arranged so as to cross a virtual line CL2 equidistant from the feeding elements of the sub antenna SA1 and the feeding elements of the sub antenna SA2. Further, the filter 1571 and the filter 1572 are arranged side by side in the second direction (X-axis direction) orthogonal to the first direction (negative direction of Y axis) toward the sub antenna SA2 from the sub antenna SA1.

The filter 1581 for polarization in the X-axis direction for the feeding elements 1211 and 1212 is arranged between the feeding element 1211 and the feeding element 1212. On the other hand, the filter 1582 for polarization in the X-axis direction for the feeding elements 1213 and 1214 is arranged between the feeding element 1213 and the feeding element 1214.

As described above, all of the filters can be formed in the regions of the distance of $\lambda/4$ from the feeding elements included in the two sub antennas by arranging the filters corresponding to the adjacent sub antennas side by side in the direction orthogonal to the array direction of the sub antennas. Therefore, increase in the size of the antenna module in the array antenna can be suppressed.

In the antenna module 100F in FIG. 17, the "sub antenna SA1" and the "sub antenna SA2" correspond to a "first sub antenna" and a "second sub antenna" in the present disclosure, respectively. Further, the "filter 1571" and the "filter 1572" correspond to the "first filter" and the "second filter" in the present disclosure.

(First Modification)

In the antenna module according to each of the above-described embodiments, the configuration has been described in which the feeding elements and the ground electrode are formed in the dielectric substrate formed of a dielectric having a single dielectric constant. A first modification describes a configuration in which a dielectric substrate is formed of dielectric layers having different dielectric constants.

Figure 18:
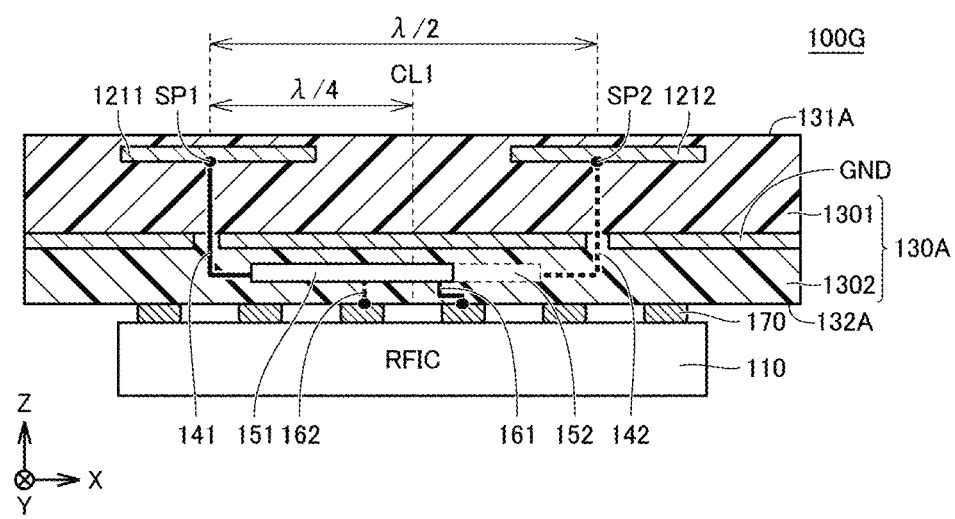
FIG. 18 is a side perspective view of an antenna module in a first modification.

FIG. 18 is a side perspective view of an antenna module 100G in the first modification. In the antenna module 100G, the dielectric substrate 130 of the antenna module 100 illustrated in FIG. 3 is replaced by a dielectric substrate 130A. In FIG. 18, description of components overlapping with those in FIG. 3 will not be repeated.

Referring to FIG. 18, the dielectric substrate 130A of the antenna module 100G is formed of a first dielectric 1301 and a second dielectric 1302 having different dielectric constants. The first dielectric 1301 includes an upper surface 131A. More specifically, the second dielectric 1302 is made of a material having a dielectric constant higher than that of the first dielectric 1301. The first dielectric 1301 is arranged above the second dielectric 1302. The RFIC 110 is mounted on the lower surface of the second dielectric 1302 (that is, a lower surface 132A of the dielectric substrate 130A) with the solder bumps 170 interposed therebetween.

In the antenna module 100G, the feeding elements 1211 and 1212 are formed in the first dielectric 1301, and the ground electrode GND is formed in the second dielectric 1302. The filters 151 and 152 are also formed in the second dielectric 1302. In the example of FIG. 18, the ground electrode GND is arranged at the boundary between the first dielectric 1301 and the second dielectric 1302. The ground electrode GND may be arranged in an inner layer of the second dielectric 1302.

In general, in order to broaden the frequency bandwidth of radio waves that are radiated from the feeding elements, it is preferable that the dielectric constant between the feeding elements and the ground electrode be lowered. On the other hand, in order to increase Q values of the filters, it is preferable that the dielectric constant of the dielectric in which the filters are formed be increased. As described above, antenna characteristics and filter characteristics may have a trade-off relationship for the dielectric constant. Therefore, when the dielectric substrate is formed of a dielectric having a single dielectric constant, the dielectric constant is not necessarily suitable for the two characteristics in some cases.

In the antenna module 100G in the first modification, the dielectric (first dielectric 1301) between the feeding elements 1211 and 1212 and the ground electrode GND is formed of the dielectric having the relatively low dielectric constant. Further, the dielectric (second dielectric 1302) below the ground electrode GND in which the filters 151 and 152 are formed is formed of the dielectric having the higher dielectric constant than that of the first dielectric 1301. Thus, it is possible to improve both the antenna characteristics and the filter characteristics by forming the dielectric substrate using two dielectric layers having different dielectric constants and making the dielectric constant of the dielectric in which the filters are formed higher than the dielectric constant of the dielectric formed between the feeding elements and the ground electrode.

(Second Modification)

In the antenna module according to each of the above-described embodiments, the configuration that the feeding elements and the ground electrode are formed in the same dielectric substrate has been described. A second modification describes a configuration in which feeding elements and a ground electrode are formed in different dielectric substrates separated from each other.

Figure 19:
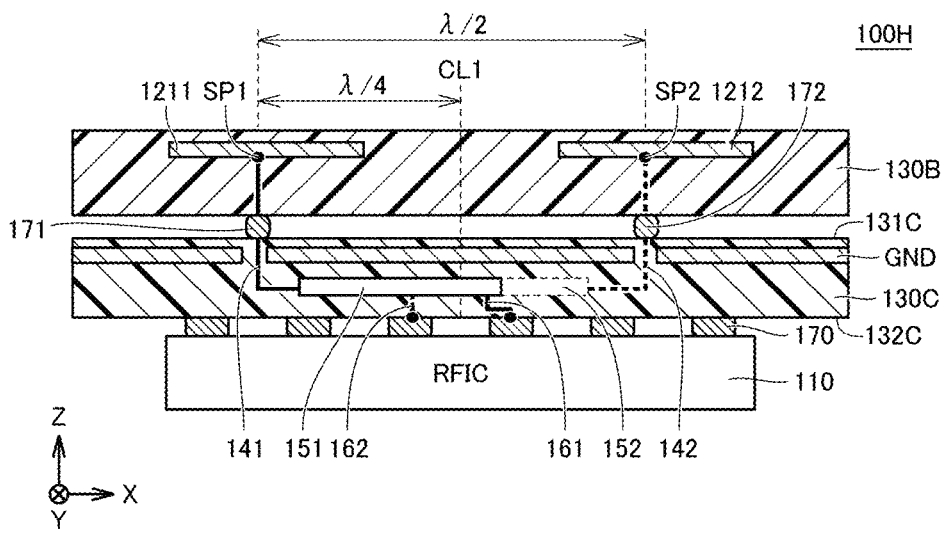
FIG. 19 is a side perspective view of an antenna module in a second modification.

FIG. 19 is a side perspective view of an antenna module 100H in the second modification. In the antenna module 100H, the dielectric substrate 130 of the antenna module 100 illustrated in FIG. 3 is replaced by two dielectric substrates 130B and 130C separated from each other. The dielectric substrate 130C includes an upper surface 131C. In FIG. 19, description of components overlapping with those in FIG. 3 will not be repeated.

Referring to FIG. 19, the feeding element 1211 and the feeding element 1212 are formed in the dielectric substrate 130B in the antenna module 100H. On the other hand, the ground electrode GND and the filters 151 and 152 are formed in the dielectric substrate 130C separated from the dielectric substrate 130B. The RFIC 110 is mounted on a lower surface 132C of the dielectric substrate 130C with the solder bumps 170 interposed therebetween.

The dielectric substrate 130B and the dielectric substrate 130C are connected by a connection member. Although solder bumps 171 and 172 are used as the connection member in the example of FIG. 19, the connection member may be a flexible cable or a connector.

The feeding wiring 141 electrically connects the filter 151 and the feeding element 1211 with the solder bump 171 interposed therebetween. Similarly, the feeding wiring 142 electrically connects the filter 152 and the feeding element 1212 with the solder bump 172 interposed therebetween. When the dielectric substrate 130C is viewed in plan from the normal direction, each of the filters 151 and 152 is arranged between the solder bump 171 and the solder bump 172 so as to cross the virtual line CL1 equidistant from the solder bumps 171 and 172.

As described above, the feeding elements can be flexibly arranged in the communication apparatus by separating the dielectric substrate in which the feeding elements are formed from the dielectric substrate in which the ground electrode and the filters are formed.

In addition, as in the first modification described above, both the antenna characteristics and the filter characteristics can also be improved by relatively decreasing the dielectric constant of the dielectric substrate in which the feeding elements are formed and relatively increasing the dielectric constant of the dielectric substrate in which the ground electrode and the filters are formed.

The "dielectric substrate 130C" in the second modification corresponds to a "circuit substrate" in the present disclosure. The "solder bump 171" and the "solder bump 172" in the second modification correspond to a "first terminal" and a "second terminal" of the present disclosure, respectively.

Sixth Embodiment

In the above-described embodiments, the configuration has been described in which the filters are formed on the feeding wiring extending from the RFIC to the radiation elements in the antenna device. A sixth embodiment describes a configuration in which filters are formed on paths before signal branching in the RFIC.

Figure 20:
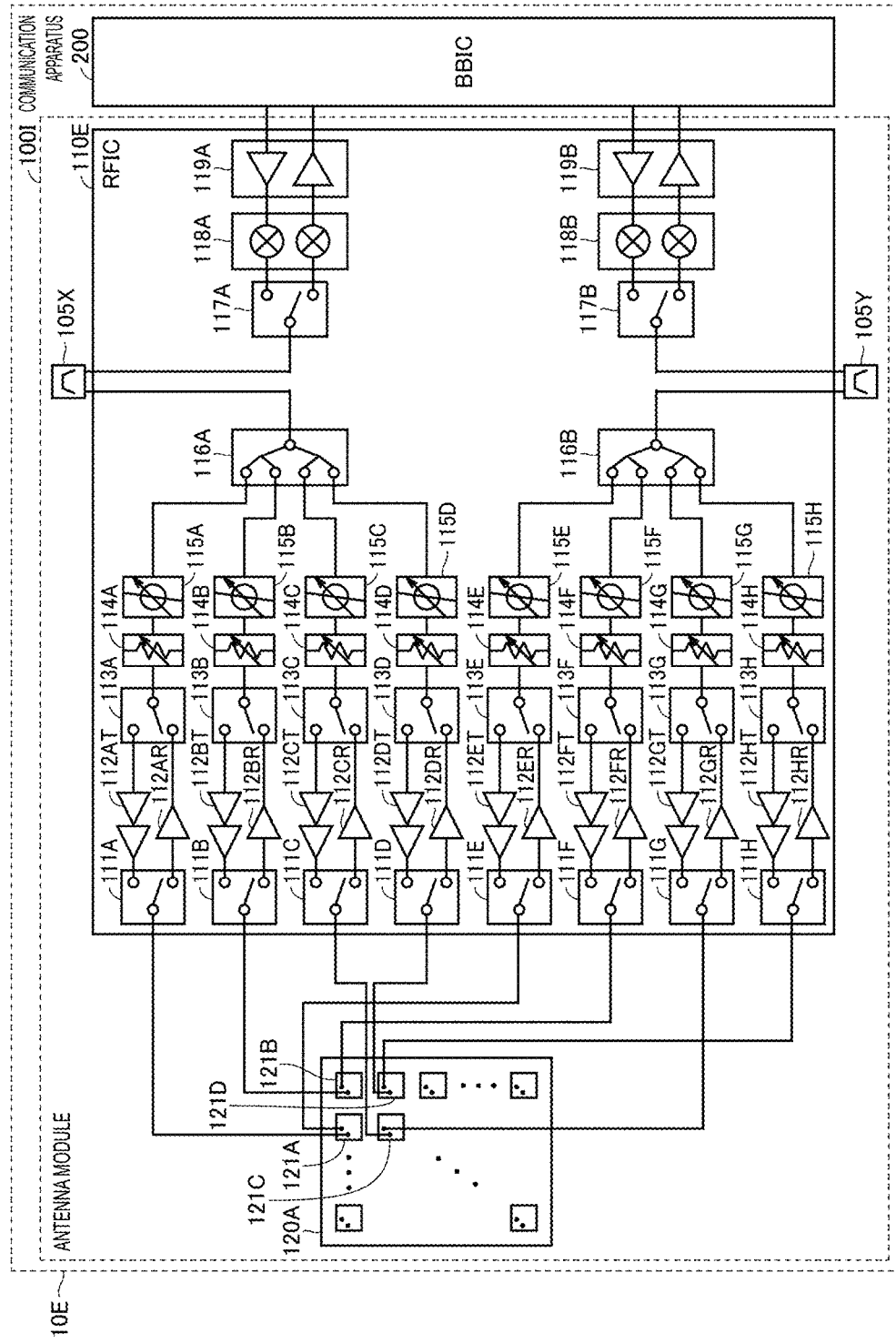
FIG. 20 is a block diagram of a communication apparatus to which an antenna module according to a sixth embodiment is applied.

FIG. 20 is a block diagram of a communication apparatus 10E to which an antenna module 100I according to the sixth embodiment is applied. Referring to FIG. 20, the communication apparatus 10E includes the antenna module 100I and the BBIC 200. The antenna module 100I includes an RFIC 110E, the antenna device 120A, and filters 105X and 105Y.

The antenna device 120A is a dual polarization-type antenna device similarly to the antenna module 100C illustrated in FIG. 8, and a radio frequency signal for first polarization and a radio frequency signal for second polarization are supplied from the RFIC 110I to each of the feeding elements 1211 and 1212.

In the antenna module 100C (FIG. 8) in the second embodiment, the radio frequency signals from the RFIC 110A are transmitted to the antenna device 120A after passing through the filter device 106. In the antenna module 100I in the sixth embodiment, the RFIC 110E and the antenna device 120A are directly connected to each other by feeding wiring, and each of the filters 105X and 105Y is connected between the signal multiplexer/demultiplexer and the switch in the RFIC 110E. To be more specific, the filter 105X is a filter for the first polarization and is connected between the signal multiplexer/demultiplexer 116A and the switch 117A. The filter 105Y is a filter for the second polarization and is connected between the signal multiplexer/demultiplexer 116B and the switch 117B. The filters 105X and 105Y are arranged outside the RFIC 110E. Specifically, they are formed inside the antenna device 120A as will be described later with reference to FIGS. 21 and 22. Other components constituting the RFIC 110E are similar to those of the RFIC 110A in FIG. 8, and overlapping description of the components will not be repeated.

Figure 21:
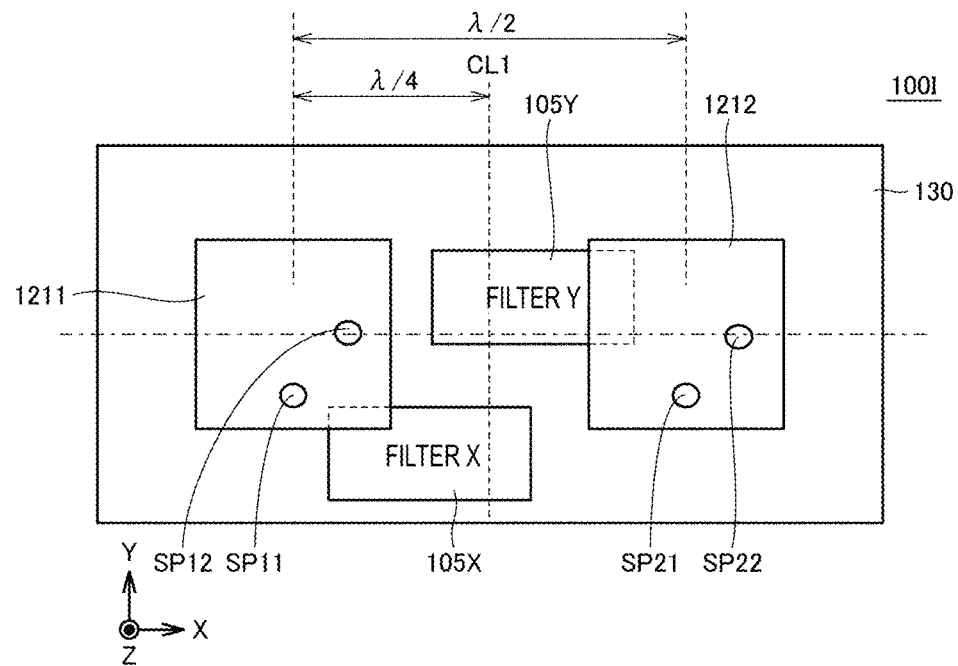
FIG. 21 is a plan perspective view of the antenna module in FIG. 20.
Figure 22:
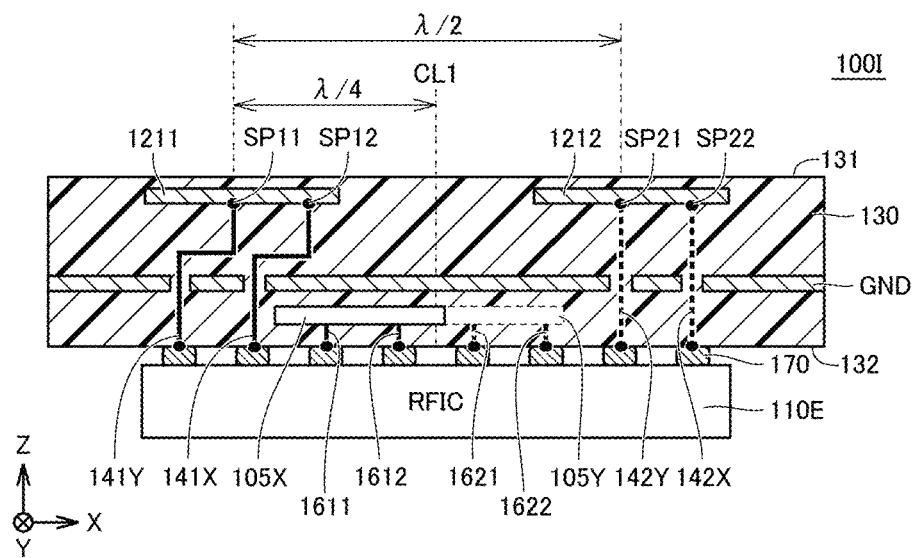
FIG. 22 is a side perspective view of the antenna module in FIG. 20.

FIGS. 21 and 22 illustrate a detailed configuration of the antenna module 100I in FIG. 20. FIG. 21 is a plan perspective view of the antenna module 100I. FIG. 22 is a side perspective view of the antenna module 100I. In the plan view of FIG. 21, the dielectric of the dielectric substrate 130 and the ground electrode GND are omitted for ease of description.

Referring to FIGS. 21 and 22, the antenna module 100I is an array antenna in which the two feeding elements 1211 and 1212 are arrayed in the X-axis direction, similarly to the antenna module 100C illustrated in FIG. 9. The feeding elements 1211 and 1212 are arranged on the upper surface 131 of the dielectric substrate 130 or in an internal layer thereof. In the dielectric substrate 130, the ground electrode GND having a flat plate shape is arranged in a layer closer to the lower surface 132 than the feeding elements 1211 and 1212 so as to face the feeding elements 1211 and 1212. The RFIC 110 is mounted on the lower surface 132 of the dielectric substrate 130 with the solder bumps 170 interposed therebetween.

In the dielectric substrate 130, the filters 105X and 105Y are arranged on the lower surface 132 side of the ground electrode GND. The filter 105X is connected to the RFIC 110 by connection wiring 1611 and connection wiring 1612. Further, the filter 105Y is connected to the RFIC 110 by connection wiring 1621 and connection wiring 1622. When the antenna module 100I is viewed in plan from the normal direction, each of the filters 105X and 105Y is arranged so as to cross the virtual line CL1 equidistant from the feeding element 1211 and the feeding element 1212. The filters 105X and 105Y are arranged side by side in the Y-axis direction.

The feeding points SP11 and SP12 of the feeding element 1211 are directly connected to the RFIC 110E by feeding wiring 141Y and feeding wiring 141X, respectively. When a radio frequency signal is supplied to the feeding point SP12, radio waves having the polarization direction being the X-axis direction are radiated from the feeding element 1211. When a radio frequency signal is supplied to the feeding point SP11, radio waves having the polarization direction being the Y-axis direction are radiated from the feeding element 1211.

Similarly, the feeding points SP21 and SP22 of the feeding element 1212 are directly connected to the RFIC 110E by feeding wiring 142Y and feeding wiring 142X, respectively. When a radio frequency signal is supplied to the feeding point SP22, radio waves having the polarization direction being the X-axis direction are radiated from the feeding element 1212. When a radio frequency signal is supplied to the feeding point SP21, radio waves having the polarization direction being the Y-axis direction are radiated from the feeding element 1212.

The filter 105X is a filter device for radio waves having the polarization direction being the X-axis direction in the feeding elements 1211 and 1212. The radio frequency signal that has passed through the filter 105X is supplied to the feeding point SP12 of the feeding element 1211 and the feeding point SP22 of the feeding element 1212. The filter 105Y is a filter device for radio waves having the polarization direction being the Y-axis direction in the feeding elements 1211 and 1212. The radio frequency signal that has passed through the filter 105Y is supplied to the feeding point SP11 of the feeding element 1211 and the feeding point SP21 of the feeding element 1212.

It is possible to reduce the number of filters formed in the antenna module by adopting the configuration in which common filters are provided for the circuits in the respective polarization directions as in the antenna module 100I. Therefore, further miniaturization of the whole antenna module can be realized. Further, increase in the size of the antenna module can be suppressed by arranging the filters so as to cross the virtual line equidistant from two adjacent feeding elements.

In the sixth embodiment, the "feeding element 1211" and the "feeding element 1212" correspond to the "first radiation element" and the "second radiation element" in the present disclosure, respectively, and the "filter 105X" and the "filter 105Y" correspond to the "first filter" and the "second filter" in the present disclosure, respectively. The "X-axis direction" and the "Y-axis direction" in the sixth embodiment correspond to a "first direction" and a "second direction" in the present disclosure, respectively. In the sixth embodiment, the "feeding point SP11" and the "feeding point SP21" correspond to a "first feeding point" in the present disclosure, and the "feeding point SP12" and the "feeding point SP22" correspond to a "second feeding point" in the present disclosure.

It should be considered that the embodiments disclosed herein are illustrative and not restrictive in all respects. The scope of the present disclosure is defined not by description of the above-described embodiments but by the scope of the claims and is intended to include all modifications within the meaning and scope equivalent to the scope of the claims.

REFERENCE SIGNS LIST

10 AND 10A to 10E COMMUNICATION APPARATUS
SP1, SP1A, SP1B, SP2, SP2A, SP2B, SP11, SP12, SP21, SP22, SP31, SP32, SP41, AND SP42 FEEDING POINT
100 AND 100A to 100I ANTENNA MODULE
105, 106, 107, 108, AND 109 FILTER DEVICE
105A TO 105D, 105X, 105Y, 106A TO 106H, 107A1 TO 107D1, 107A2 TO 107D2, 108A1, 108A2, 108H1, 108H2, 109A TO 109D, 150, 150A, 150B, 151, 151A, 151B, 152, 152A, 152B, 156B, 1511, 1512, 1521, 1522, 1571, 1572, 1581, AND 1582 FILTER
107A to 107D, 108A to 108H, 155, AND 156 DIPLEXER
111, 113, 117, 181, 183, AND 187 SWITCH
110 AND 110A TO 110E RFIC
112AR TO 112HR AND 182AR TO 182DR LOW NOISE AMPLIFIER
112AT to 112HT AND 182AT to 182DT POWER AMPLIFIER
114 AND 184 ATTENUATOR
115 AND 185 PHASE SHIFTER
116 AND 186 SIGNAL MULTIPLEXER/DEMULTIPLEXER
118 AND 188 MIXER
119 AND 189 AMPLIFIER CIRCUIT
120 ANTENNA DEVICE
121 FEEDING ELEMENT
122 PARASITIC ELEMENT
130 AND 130A TO 130C DIELECTRIC SUBSTRATE
1301 AND 1302 DIELECTRIC
141 AND 142 FEEDING WIRING
161, 162, 1611, 1612, 1621, AND 1622 CONNECTION WIRING
170 to 172 SOLDER BUMP
191, 192, 1503, 1505, 1506, AND 1508 LINE
210 BRANCH CIRCUIT
1501 INPUT TERMINAL
1502 OUTPUT TERMINAL
1504 AND 1507 VIA
200 BBIC
GND GROUND ELECTRODE
SA1 AND SA2 SUB ANTENNA

The invention claimed is:

1. An antenna module comprising:
a first radiation element having a planar shape;
a second radiation element having a planar shape and arranged adjacent to the first radiation element;
a first filter connected to the first radiation element; and
a second filter distinct and separate from the first filter, and connected to the second radiation element, wherein
each of the first filter and the second filter includes a plurality of resonant lines not connected to each other,
each of the first filter and the second filter is arranged between the first radiation element and the second radiation element so as to cross a virtual line equidistant from the first radiation element and the second radiation element when the antenna module is viewed in plan from a normal direction,
a direction toward the second radiation element from the first radiation element is defined as a first direction,
the first filter and the second filter are arranged side-by-side in a second direction different from the first direction,
each of the first radiation element and the second radiation element is provided with a first feeding point at a position offset in the second direction from a center point of a corresponding radiation element,
the first filter is arranged further on the second direction side with respect to the first feeding point of the first radiation element, and
the second filter is arranged in a direction opposite to the second direction with respect to the first feeding point of the second radiation element.

2. The antenna module according to claim 1, further comprising:
a ground electrode arranged so as to face the first radiation element and the second radiation element, wherein
the ground electrode is arranged in a layer between the first filter and the second filter, and
the first radiation element and the second radiation element.

3. The antenna module according to claim 1, further comprising:
a ground electrode arranged so as to face the first radiation element and the second radiation element,
wherein the first filter and the second filter are arranged in a layer between the first radiation element and the second radiation element and the ground electrode.

4. The antenna module according to claim 1, wherein the first filter and the second filter do not overlap with each other when the antenna module is viewed in plan from a normal direction of a radiating surface of the antenna module.

5. The antenna module according to claim 1, wherein when the antenna module is viewed in plan from a normal direction of a radiating surface of the antenna module, the first filter does not overlap with the second radiation element, and
the second filter does not overlap with the first radiation element.

6. The antenna module according to claim 1, wherein each of the first radiation element and the second radiation element is provided with a second feeding point at a position offset in the first direction from a center point of the corresponding radiation element, and
the antenna module further comprises:
a third filter connected to the second feeding point of the first radiation element; and
a fourth filter connected to the second feeding point of the second radiation element.

7. The antenna module according to claim 1, wherein each of the first radiation element and the second radiation element is provided with a second feeding point at a position offset in the first direction from the center point of the corresponding radiation element,
the first filter is connected to the first feeding point of the first radiation element, the second filter is connected to the second feeding point of the second radiation element, and the antenna module further comprises:
a third filter connected to the second feeding point of the first radiation element; and
a fourth filter connected to the first feeding point of the second radiation element.

8. The antenna module according to claim 1, wherein
each of the first radiation element and the second radiation element is provided with a second feeding point at a position offset in a direction opposite to the second direction from the center point of the corresponding radiation element,
for each of the first radiation element and the second radiation element, the first feeding point is connected to the second feeding point by a line having a length of $\lambda/2$ where $\lambda$ is a wavelength of a radio wave to be radiated,
the first filter is connected to the first feeding point of the first radiation element, and
the second filter is connected to the second feeding point of the second radiation element.

9. The antenna module according to claim 1, further comprising:
a third filter connected to the first radiation element;
a fourth filter connected to the second radiation element; and
a ground electrode arranged so as to face the first radiation element and the second radiation element, wherein
each of the first radiation element and the second radiation element includes:
a feeding element; and
a parasitic element arranged between the feeding element and the ground electrode so as to face the feeding element,
one of the first filter and the third filter is a filter corresponding to the feeding element of the first radiation element and another of the first filter and the third filter is a filter corresponding to the parasitic element of the first radiation element, and
one of the second filter and the fourth filter is a filter corresponding to the feeding element of the second radiation element and another of the second filter and the fourth filter is a filter corresponding to the parasitic element of the second radiation element.

10. The antenna module according to claim 9, wherein
a size of the parasitic element is larger than a size of the feeding element in each of the first radiation element and the second radiation element,
the antenna module further comprises, for each of the first filter, the second filter, the third filter, and the fourth filter, feeding wiring configured to transmit a radio frequency signal that has passed through a filter to a corresponding feeding element, and
the feeding wiring penetrates through the parasitic element and is connected to the feeding element.

11. The antenna module according to claim 1, further comprising:
a third filter connected to the first radiation element;
a fourth filter connected to the second radiation element; and
a ground electrode arranged so as to face the first radiation element and the second radiation element, wherein
each of the first radiation element and the second radiation element includes:
a feeding element, and
a parasitic element arranged between the feeding element and the ground electrode so as to face the feeding element,
each of the first filter, the second filter, the third filter, and the fourth filter is a diplexer including a filter element corresponding to the feeding element and a filter element corresponding to the parasitic element,
the feeding element of each of the first radiation element and the second radiation element is provided with a first feeding point for radiating a radio wave having a polarization direction being the second direction and a second feeding point for radiating a radio wave having a polarization direction being the first direction,
one of the first filter and the third filter is connected to the first feeding point of the first radiation element and another of the first filter and the third filter is connected to the second feeding point of the first radiation element, and
one of the second filter and the fourth filter is connected to the first feeding point of the second radiation element and another of the second filter and the fourth filter is connected to the second feeding point of the second radiation element.

12. The antenna module according to claim 1, further comprising a feeding circuit configured to supply a radio frequency signal to each of the first radiation element and the second radiation element.

13. A communication apparatus comprising:
the antenna module according to claim 1.

14. The antenna module according to claim 1, wherein
when the antenna module is viewed in plan from a normal direction of a radiating surface of the antenna module,
the first filter does not overlap with the second radiation element, and
the second filter does not overlap with the first radiation element.

15. An antenna module comprising:
a first radiation element having a planar shape;
a second radiation element having a planar shape and arranged adjacent to the first radiation element, each of the first radiation element and the second radiation element is provided with a first feeding point at a position offset in a second direction from a center point of a corresponding radiation element and is provided with a second feeding point at a position offset in a first direction from the center point of the corresponding radiation element;
a first filter configured to filter a radio frequency signal that is supplied to the second feeding point of each of the first radiation element and the second radiation element; and
a second filter distinct and separate from the first filter, and configured to filter a radio frequency signal that is supplied to the first feeding point of each of the first radiation element and the second radiation element, wherein
each of the first filter and the second filter includes a plurality of resonant lines not connected to each other, and
each of the first filter and the second filter is arranged between the first radiation element and the second radiation element so as to cross a virtual line equidistant from the first radiation element and the second radiation element when the antenna module is viewed in plan from a normal direction.

16. An antenna module comprising:
a first radiation element having a planar shape;
a second radiation element having a planar shape and arranged adjacent to the first radiation element;
a first filter connected to the first radiation element; and
a second filter connected to the second radiation element, wherein
each of the first filter and the second filter includes a plurality of resonant lines not connected to each other,
each of the first filter and the second filter is arranged between the first radiation element and the second radiation element so as to cross a virtual line equidistant from the first radiation element and the second radiation element when the antenna module is viewed in plan from a normal direction,
a direction toward the second radiation element from the first radiation element is defined as a first direction,
the first filter and the second filter are arranged side-by-side in a second direction different from the first direction,
each of the first radiation element and the second radiation element is provided with a first feeding point at a position offset in the second direction from a center point of a corresponding radiation element,
the first filter is arranged further on the second direction side with respect to the first feeding point of the first radiation element, and
the second filter is arranged in a direction opposite to the second direction with respect to the first feeding point of the second radiation element.

17. The antenna module according to claim 16, further comprising:
a ground electrode arranged so as to face the first radiation element and the second radiation element, wherein
the ground electrode is arranged in a layer between the first filter and the second filter, and
the first radiation element and the second radiation element.

18. The antenna module according to claim 16, further comprising:
a ground electrode arranged so as to face the first radiation element and the second radiation element,
wherein the first filter and the second filter are arranged in a layer between the first radiation element and the second radiation element and the ground electrode.

19. The antenna module according to claim 16, wherein the first filter and the second filter do not overlap with each other when the antenna module is viewed in plan from a normal direction of a radiating surface of the antenna module.

20. The antenna module according to claim 16, wherein
each of the first radiation element and the second radiation element is provided with a second feeding point at a position offset in the first direction from a center point of the corresponding radiation element, and
the antenna module further comprises:
a third filter connected to the second feeding point of the first radiation element; and
a fourth filter connected to the second feeding point of the second radiation element.

* * * * *